(12) United States Patent
Moriwaki et al.

(10) Patent No.: US 6,580,429 B1
(45) Date of Patent: Jun. 17, 2003

(54) METHOD OF GENERATING DATA FOR THREE-DIMENSIONAL GRAPHIC RECORDING MEDIUM AND THREE-DIMENSIONAL GRAPHIC SYSTEM

(75) Inventors: Shohei Moriwaki, Tokyo (JP); Yoshifumi Azekawa, Tokyo (JP); Osamu Chiba, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 329 days.

(21) Appl. No.: 09/639,066

(22) Filed: Aug. 16, 2000

(30) Foreign Application Priority Data

Jan. 25, 2000 (JP) .................................. 2000-015597

(51) Int. Cl.⁷ .............................................. G06T 15/50
(52) U.S. Cl. ...................................... 345/426; 345/419
(58) Field of Search ................................ 345/418, 419, 345/425, 426

(56) References Cited

U.S. PATENT DOCUMENTS

| | | | |
|---|---|---|---|
| 5,819,016 A | * 10/1998 | Watanabe et al. | 345/419 |
| 6,396,491 B2 | * 5/2002 | Watanabe et al. | 345/419 |
| 6,480,190 B1 | * 11/2002 | Pfister et al. | 345/419 |

FOREIGN PATENT DOCUMENTS

| | | |
|---|---|---|
| JP | 7-262387 | 10/1995 |
| JP | 8-7123 | 1/1996 |
| JP | 8-212377 | 8/1996 |

OTHER PUBLICATIONS

"Application Graphic", ASCII Publishing Office, Apr. 17, 1989, pp. 47–57 (English language explanation of disclosure of article attached).

* cited by examiner

*Primary Examiner*—Cliff N. Vo
(74) *Attorney, Agent, or Firm*—Burns, Doane, Swecker & Mathis, LLP

(57) ABSTRACT

Obtained is a method of generating data for three-dimensional graphics which can perform three-dimensional graphics display at a practical level also in the case in which a three-dimensional graphics system having a comparatively low throughput is used. Object data (10) and scene data (11) are sequentially read in one frame unit (S1), and an operation processing including a geometric operation and a light source computation is executed for the data read at the step (S1) (S2 to S6). Furthermore, an optimization processing is executed such that a data amount of data for 3D-CG can be reduced based on a hardware constraint including a constraint related to a throughput of a three-dimensional graphics system (S7, S8). Thus, the data for 3D-CG are obtained.

11 Claims, 18 Drawing Sheets

FIG. 2

$\{$
$\{((X_{B1}, Y_{B1}, Z_{B1}, R_1, G_1, B_1, \alpha_1, U_1, V_1),$
$(X_{B2}, Y_{B2}, Z_{B2}, R_2, G_2, B_2, \alpha_2, U_2, V_2),$
$(X_{B3}, Y_{B3}, Z_{B3}, R_3, G_3, B_3, \alpha_3, U_3, V_3))\}$ ...... 20B-1

$\{((X_{B1}, Y_{B1}, Z_{B1}, R_1, G_1, B_1, \alpha_1, U_1, V_1),$
$(X_{B2}, Y_{B2}, Z_{B2}, R_2, G_2, B_2, \alpha_2, U_2, V_2),$
$(X_{B4}, Y_{B4}, Z_{B4}, R_4, G_4, B_4, \alpha_4, U_4, V_4))\}$ ...... 20B-2

$\{((X_{B1}, Y_{B1}, Z_{B1}, R_1, G_1, B_1, \alpha_1, U_1, V_1),$
$(X_{B3}, Y_{B3}, Z_{B3}, R_3, G_3, B_3, \alpha_3, U_3, V_3),$
$(X_{B4}, Y_{B4}, Z_{B4}, R_4, G_4, B_4, \alpha_4, U_4, V_4))\}$ ...... 20B-3

$\{((X_{B2}, Y_{B2}, Z_{B2}, R_2, G_2, B_2, \alpha_2, U_2, V_2),$
$(X_{B3}, Y_{B3}, Z_{B3}, R_3, G_3, B_3, \alpha_3, U_3, V_3),$
$(X_{B4}, Y_{B4}, Z_{B4}, R_4, G_4, B_4, \alpha_4, U_4, V_4))\}$ ...... 20B-4
$\}$

$\{\ \{\ (\ (X_{w1},\ Y_{w1},\ Z_{w1},\ R_1,\ G_1,\ B_1,\ \alpha_1,\ U_1,\ V_1)\ ,$
$(X_{w2},\ Y_{w2},\ Z_{w2},\ R_2,\ G_2,\ B_2,\ \alpha_2,\ U_2,\ V_2)\ ,$
$(X_{w3},\ Y_{w3},\ Z_{w3},\ R_3,\ G_3,\ B_3,\ \alpha_3,\ U_3,\ V_3)\ )\ \}\ \ \cdots\cdots\ 20W-1$ $\{\ (\ (X_{w1},\ Y_{w1},\ Z_{w1},\ R_1,\ G_1,\ B_1,\ \alpha_1,\ U_1,\ V_1)\ ,$
$(X_{w2},\ Y_{w2},\ Z_{w2},\ R_2,\ G_2,\ B_2,\ \alpha_2,\ U_2,\ V_2)\ ,$
$(X_{w4},\ Y_{w4},\ Z_{w4},\ R_4,\ G_4,\ B_4,\ \alpha_4,\ U_4,\ V_4)\ )\ \}\ \ \cdots\cdots\ 20W-2$ $\{\ (\ (X_{w1},\ Y_{w1},\ Z_{w1},\ R_1,\ G_1,\ B_1,\ \alpha_1,\ U_1,\ V_1)\ ,$
$(X_{w3},\ Y_{w3},\ Z_{w3},\ R_3,\ G_3,\ B_3,\ \alpha_3,\ U_3,\ V_3)\ ,$
$(X_{w4},\ Y_{w4},\ Z_{w4},\ R_4,\ G_4,\ B_4,\ \alpha_4,\ U_4,\ V_4)\ )\ \}\ \ \cdots\cdots\ 20W-3$ $\{\ (\ (X_{w2},\ Y_{w2},\ Z_{w2},\ R_2,\ G_2,\ B_2,\ \alpha_2,\ U_2,\ V_2)\ ,$
$(X_{w3},\ Y_{w3},\ Z_{w3},\ R_3,\ G_3,\ B_3,\ \alpha_3,\ U_3,\ V_3)\ ,$
$(X_{w4},\ Y_{w4},\ Z_{w4},\ R_4,\ G_4,\ B_4,\ \alpha_4,\ U_4,\ V_4)\ )\ \}\ \}\ \ \cdots\cdots\ 20W-4$

$$\{\{(X_{s1}, Y_{s1}, Z_{s1}, R_1, G_1, B_1, \alpha_1, U_1, V_1),$$
$$(X_{s2}, Y_{s2}, Z_{s2}, R_2, G_2, B_2, \alpha_2, U_2, V_2),$$
$$(X_{s3}, Y_{s3}, Z_{s3}, R_3, G_3, B_3, \alpha_3, U_3, V_3)\} \cdots 20S-1$$

$$\{(X_{s1}, Y_{s1}, Z_{s1}, R_1, G_1, B_1, \alpha_1, U_1, V_1),$$
$$(X_{s2}, Y_{s2}, Z_{s2}, R_2, G_2, B_2, \alpha_2, U_2, V_2),$$
$$(X_{s4}, Y_{s4}, Z_{s4}, R_4, G_4, B_4, \alpha_4, U_4, V_4)\} \cdots 20S-2$$

$$\{(X_{s1}, Y_{s1}, Z_{s1}, R_1, G_1, B_1, \alpha_1, U_1, V_1),$$
$$(X_{s3}, Y_{s3}, Z_{s3}, R_3, G_3, B_3, \alpha_3, U_3, V_3),$$
$$(X_{s4}, Y_{s4}, Z_{s4}, R_4, G_4, B_4, \alpha_4, U_4, V_4)\} \cdots 20S-3$$

$$\{(X_{s2}, Y_{s2}, Z_{s2}, R_2, G_2, B_2, \alpha_2, U_2, V_2),$$
$$(X_{s3}, Y_{s3}, Z_{s3}, R_3, G_3, B_3, \alpha_3, U_3, V_3),$$
$$(X_{s4}, Y_{s4}, Z_{s4}, R_4, G_4, B_4, \alpha_4, U_4, V_4)\} \cdots 20S-4$$
$$\}$$

15

FIG. 12
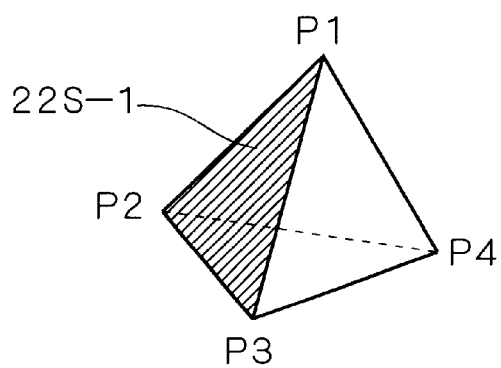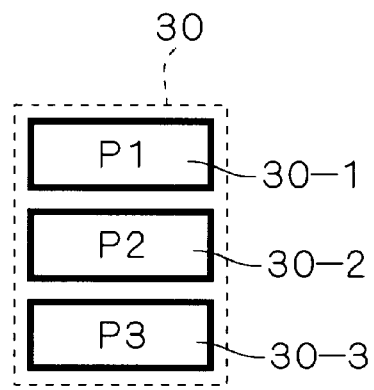
FIG. 13
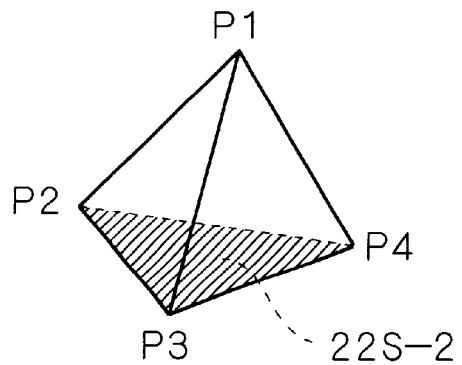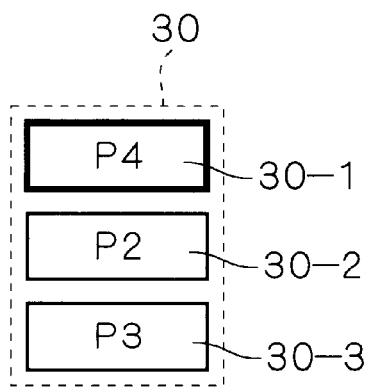

METHOD OF GENERATING DATA FOR THREE-DIMENSIONAL GRAPHIC RECORDING MEDIUM AND THREE-DIMENSIONAL GRAPHIC SYSTEM

BACKGROUND OF THE INVENTION

1. Field of the Invention

The present invention relates to a method of generating data for three-dimensional graphics in which three-dimensional graphics display can be carried out with a comparatively simple circuit structure.

2. Description of the Background Art

In a conventional three-dimensional graphic accelerator, a vertex data value (X, Y, Z, R, G, B, α, U, V) of each polygon on a screen is to be calculated by screen projection coordinate transformation (geometry operation) prior to drawing on a screen. This is intended for implementing interactive properties (for example, an operator can freely move a view point and a character in a virtual three-dimensional space). (X, Y, Z) denotes three-dimensional coordinates, α denotes an α value (data indicative of a transmittance), (R, G, B) denotes color data, and (U, V) denotes texture coordinate data. Texture data defining a pattern corresponding to each vertex data are further added. The texture coordinate data are informations for cutting out (arranging) the pattern defined by the texture data.

The prior art related to three-dimensional graphics has been disclosed in Japanese Patent Application Laid-Open No. 8-212377 (1996), Japanese Patent Application Laid-Open No. 7-262387 (1995), Japanese Patent Application Laid-Open No. 8-7123 (1996) and the like, for example. The prior document teaching the modeling of the three-dimensional graphics includes "Application Graphics, ASCII publishing office, pp. 47–57) and the like.

FIG. 23 is a block diagram showing a structure of a three-dimensional graphics system in a conventional portable game machine and some amusement equipment.

As shown in FIG. 23, a CPU 1, a ROM 2, a RAM 3, a sound source IC 4, an image memory 6, a display unit 7 and an input device 9 are directly connected to a graphic accelerator 5P, and a speaker 8 is connected to the sound source IC 4.

The CPU 1 executes a program stored in the ROM 2 based on an input information obtained from the input device 9, thereby generating three-dimensional object data in a frame unit and sequentially transferring them to the graphic accelerator 5P. At this time, the RAM 3 is used as a work area by the CPU 1. Moreover, the CPU 1 transfers a playing information to the sound source IC 4 if necessary, and the sound source IC 4 converts the playing information into voice data and outputs the voice data to the speaker 8.

The graphic accelerator 5P performs a three-dimensional graphics operation for three-dimensional object data transferred from the CPU 1 and writes the resultant screen drawing data to the image memory 6. The screen drawing data of the image memory 6 are transferred to the display unit 7 in a specified timing.

The graphic accelerator 5P includes a geometry processing section 5P1, a light source processing section 5P2 and a rendering section 5P3. The three-dimensional object data are subjected to a geometry operation by the geometry processing section 5P1, a processing related to a light source by the light source processing section 5P2 and a rendering processing by the rendering section 5P3. The screen drawing data thus obtained are written to the image memory 6.

FIG. 24 shows an operation flow of a conventional method of generating a three-dimensional graphics control program.

With reference to FIG. 24, at a step S11, an in-frame control information 27 defining the contents of control in one frame is manually created based on object data 10 in which a shape of an object is represented by, body coordinates and scene data 11 in which a positional relationship of the object in a virtual three-dimensional space is represented by world coordinates.

At a step S12, a three-dimensional graphics control program 28 for a sound, an event obtained from the input device 9 and the like is manually created based on the in-frame control information 27.

However, in the case in which the system shown in FIG. 23 is to be implemented by a portable game machine or the like having limitations on a hardware structure, it is hard to store, in the ROM 2, an enormous three-dimensional graphics information which has not been subjected to the geometry operation and to provide the geometry processing section 5P1 having a comparatively great circuit scale in the graphic accelerator 5P.

Main three-dimensional graphics informations to be stored in the ROM 2 are as follows:

① a body coordinate value defining the movement of an object present in a space;

② various polygon informations in body coordinates (vertex coordinate value/blend color information/texture information);

③ a world coordinate value defining a relative positional relationship of an object;

④ a positional relationship between a view point and world coordinates; and

⑤ a positional relationship between a light source and world coordinates.

In an apparatus in which a hardware structure is restricted, interactive properties are restricted based on a screen size and matters for restriction on amusing properties, or are abolished. Moreover, there is not a method of generating data for three-dimensional computer graphics which is suitable for a three-dimensional graphics system having a comparatively low throughput. Therefore, there has been a problem in that it is hard to implement three-dimensional graphics display at a practical level by the three-dimensional graphics system having a comparatively low throughput.

SUMMARY OF THE INVENTION

A first aspect of the present invention is directed to a method of generating data for three-dimensional graphics to be used by a predetermined three-dimensional graphics system, comprising the steps of (a) sequentially reading three-dimensional original data including object data defining a three-dimensional object in a predetermined unit, (b) executing an operation processing including a geometric operation and a light source computation for the three-dimensional original data, thereby obtaining operated three-dimensional data, and (c) obtaining the data for three-dimensional graphics based on the operated three-dimensional data, the step (c) executing an optimization processing such that a data amount of the data for three-dimensional graphics is more reduced than that of the operated three-dimensional data based on a hardware constraint including a constraint related to a throughput of the predetermined three-dimensional graphics system.

A second aspect of the present invention is directed to the method of generating data for three-dimensional graphics according to the first aspect of the present invention, wherein the step (c) includes a step of deciding a major edge to be a reference side for drawing in sides of a polygon constituting the three-dimensional object based on the operated three-dimensional data by an existing deciding method and causing the data for three-dimensional graphics to have an information defining the major edge.

A third aspect of the present invention is directed to the method of generating data for three-dimensional graphics according to the first or second aspect of the present invention, wherein the data for three-dimensional graphics have color data, the predetermined three-dimensional graphics system has a color display function based on a color index information, and the color index information has a smaller amount than the color data, the method further comprising a step of (d) replacing the color data in the data for three-dimensional graphics with the index color data.

A fourth aspect of the present invention is directed to the method of generating data for three-dimensional graphics according to any of the first to third aspects of the present invention, wherein the optimization processing at the step (c) includes a processing of generating the data for three-dimensional graphics such that repeated vertex data between a plurality of polygons constituting the object are omitted.

A fifth aspect of the present invention is directed to the method of generating data for three-dimensional graphics according to any of the first to fourth aspects of the present invention, wherein the predetermined unit includes one frame unit, and the hardware constraint includes at least one of a condition related to a storage capacity of the data for three-dimensional graphics of the predetermined three-dimensional graphics system and a condition related to a transferable data amount in one frame of the predetermined three-dimensional graphics system.

A sixth aspect of the present invention is directed to the method of generating data for three-dimensional graphics according to any of the first to fourth aspects of the present invention, wherein the three-dimensional graphics system performs three-dimensional graphics display with the same contents as those in previous frames upon receipt of a recycle indicating information, the operation processing includes an operation based on an operation condition and the predetermined unit includes a plurality of frame units, the step (a) outputs a temporary recycle indicating information if it is decided that the data for three-dimensional graphics are not changed between various frames, the step (b) outputs the recycle indicating information as the operated three-dimensional data without executing the operation processing when the temporary recycle indicating information is received and the operation condition is not changed between various frames, and the step (c) outputs the recycle indicating information as the data for three-dimensional graphics when receiving the recycle indicating information as the operated three-dimensional data.

A seventh aspect of the present invention is directed to a computer readable recording medium in which a program for causing a computer to execute the method of generating data for three-dimensional graphics according to any of the first to sixth aspects of the present invention is recorded.

According to the first aspect of the present invention, the operation processing including the geometric operation and the light source computation is executed at the step (b). It is possible to perform three-dimensional graphics display by using a three-dimensional graphics system which does not have the function of executing these processings (the geometric operation and the light source computation).

At the step (c), furthermore, the optimization processing is executed such that the data amount of the data for three-dimensional graphics is reduced based on the hardware constraint including a constraint related to the throughput of the predetermined three-dimensional graphics system. Therefore, it is also possible to reduce a storage capacity of the data for three-dimensional graphics in the predetermined three-dimensional graphics system.

As a result, also in the case in which the predetermined three-dimensional graphic data have a comparatively low throughput, the three-dimensional graphics display can be carried out at a practical level.

According to the second aspect of the present invention, the information defining a major edge is included in the data for three-dimensional graphics. Therefore, the predetermined three-dimensional graphics system does not need to have the function of executing the major edge decision processing. Correspondingly, the throughput of the predetermined three-dimensional graphics system can be reduced.

According to the third aspect of the present invention, the color data in the data for three-dimensional graphics are replaced with the index color data having a smaller information amount at the step (d). Therefore, the storage capacity of the data for three-dimensional graphics in the predetermined three-dimensional graphics system can be reduced still more.

According to the fourth aspect of the present invention, the optimization processing at the step (c) includes the processing of generating data for three-dimensional graphics such that the vertex data repeated between a plurality of polygons constituting an object are omitted. Therefore, the storage capacity of the data for three-dimensional graphics in the predetermined three-dimensional graphics system can be reduced still more.

According to the fifth aspect of the present invention, the hardware constraint includes at least one of the condition related to the storage capacity of the data for three-dimensional graphics of the predetermined three-dimensional graphics system and the condition related to the transferable data amount in one frame. Therefore, it is possible to generate data for three-dimensional graphics to be adapted to the storage capacity of the predetermined three-dimensional graphics system or the transferable data amount.

According to the sixth aspect of the present invention, if it is recognized that the data for three-dimensional graphics and the operation condition are not changed between various frames at the steps (a) and (b), the recycle indicating information is output as the data for three-dimensional graphics at the step (c). Correspondingly, the storage capacity of the data for three-dimensional graphics in the predetermined three-dimensional graphics system can be reduced still more.

According to the seventh aspect of the present invention, the computer is caused to execute the method of generating data for three-dimensional graphics which is recorded in the recording medium. Consequently, also in the case in which a three-dimensional graphics system having a comparatively low throughput is used, it is possible to automatically generate data for three-dimensional graphics capable of performing three-dimensional graphics display at a practical level.

In order to solve the above-mentioned problem, it is an object of the present invention to obtain a method of generating data for three-dimensional graphics which can carry out three-dimensional graphics display at a practical level also in the case in which a three-dimensional graphics system having a comparatively low throughput is used.

These and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing an example of object data in body coordinates;

FIG. 5 is a diagram showing an object defined by the object data in FIG. 4;

FIG. 9 is a diagram showing an example of the object data in the world coordinates;

FIGS. 11 to 15 are diagrams showing a relationship between a polygon and a vertex register;

DESCRIPTION OF THE PREFERRED EMBODIMENTS

<First Embodiment>

Figure 1:
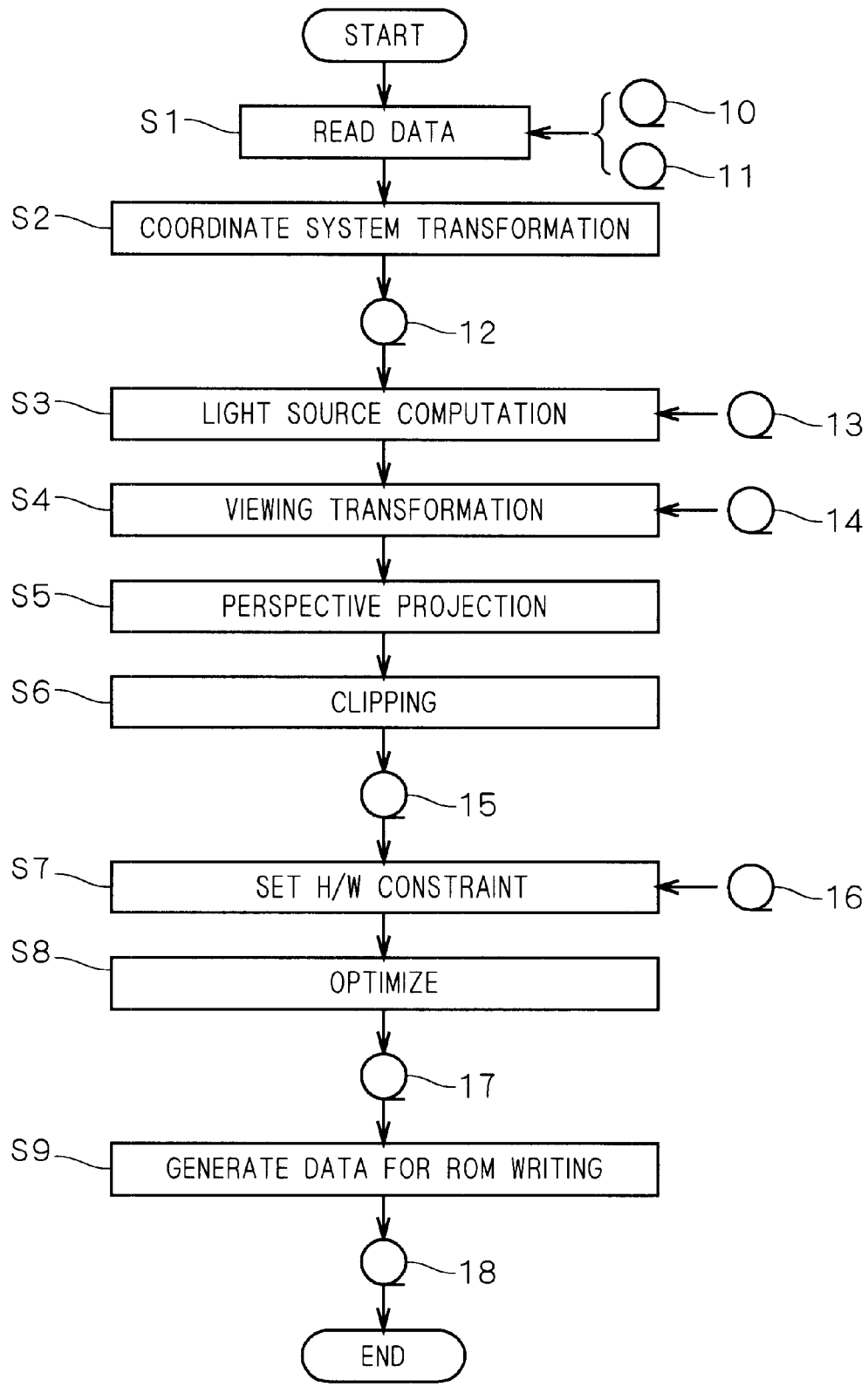
FIG. 1 is a flowchart showing an operation flow of a method of generating data for three-dimensional CG according to a first embodiment of the present invention.

FIG. 1 shows a data flow of a method of generating data for three-dimensional computer graphics (which will be hereinafter referred to as "3D-CG") according to a first embodiment of the present invention. The flow of the processing of generating data for 3D-CG will be described below with reference to FIG. 1.

First of all, at a step S1, three-dimensional original data including object data 10 representing a shape of an object by body coordinates and scene data 11 representing a positional relationship of an object in a virtual three-dimensional space by world coordinates are sequentially read in a frame unit.

Figure 3:
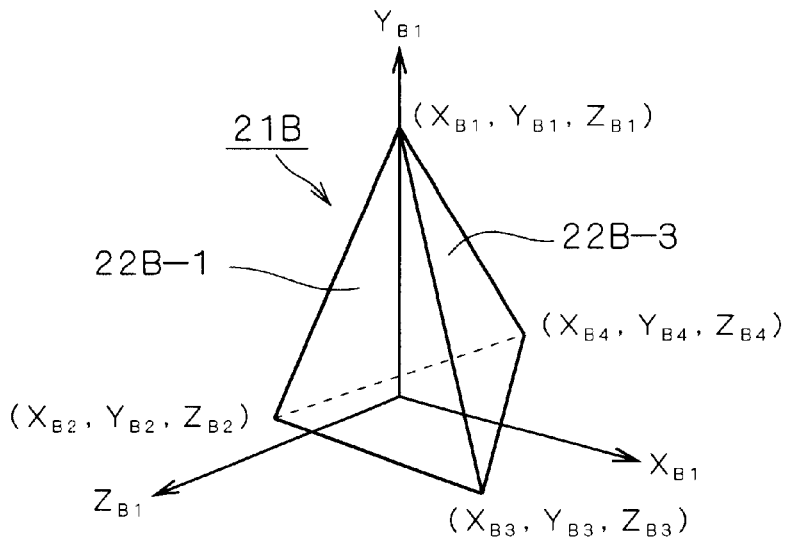
FIG. 3 is a diagram showing an object defined by the object data in FIG. 2.

The object data 10 of the body coordinates will be described below. FIG. 2 is a diagram showing an example of the object data 10. FIG. 3 is a diagram showing a body coordinate object defined by the object data 10 in FIG. 2.

As shown in FIG. 2, the object data 10 include:

polygon data 20B-1 indicated as three vertexes of $(X_{B1}, Y_{B1}, Z_{B1})$, $(X_{B2}, Y_{B2}, Z_{B2})$ and $(X_{B3}, Y_{B3}, Z_{B3})$;

polygon data 20B-2 indicated as three vertexes of $(X_{B1}, Y_{B1}, Z_{B1})$, $(X_{B2}, Y_{B2}, Z_{B2})$ and $(X_{B4}, Y_{B4}, Z_{B4})$;

polygon data 20B-3 indicated as three vertexes of $(X_{B1}, Y_{B1}, Z_{B1})$, $(X_{B3}, Y_{B3}, Z_{B3})$ and $(X_{B4}, Y_{B4}, Z_{B4})$; and polygon data 20B-4 indicated as three vertexes of $(X_{B2}, Y_{B2}, Z_{B2})$, $(X_{B3}, Y_{B3}, Z_{B3})$ and $(X_{B4}, Y_{B4}, Z_{B4})$.

As shown in FIG. 3, if the body coordinates are set to $(X_{B1}, Y_{B1}, Z_{B1})$, a body coordinate object 21B is defined by the object data 10 shown in FIG. 2. A body coordinate polygon 22B-1 is defined by the polygon data 20B-1, and a body coordinate polygon 22B-3 is defined by the polygon data 20B-3.

As shown in FIG. 2, the object data 10 have an α value ($\alpha_1$ and the like), color data ($R_1$, $G_1$, $B_1$, and the like) and texture coordinate data ($U_1$, $V_1$ and the like) in a vertex unit. The object data 10 also have texture data in a vertex unit, which is not shown in FIG. 2.

Moreover, the scene data 11 are generated by an existing scene creation processing which is not shown and are constituted by an information indicative of a positional relationship between an origin of world coordinates ($X_w$, $Y_w$, $Z_w$) and each of origins of body coordinates {($X_{B1}$, $Y_{B1}$, $Z_{B1}$), ($X_{B2}$, $Y_{B2}$, $Z_{B2}$), and the like} peculiar to each object.

Returning to FIG. 1, if an error is not made in the processing of reading the object data 10 and the scene data 11 at the step S1, the routine proceeds to a step S2.

At the step S2, a coordinate system transformation is carried out to obtain object data 12 represented by the world coordinates based on the object data 10 represented by body coordinates ($X_{Bn}$, $Y_{Bn}$, $Z_{Bn}$) and the scene data 11 represented by the world coordinates ($X_w$, $Y_w$, $Z_w$).

Figure 4:
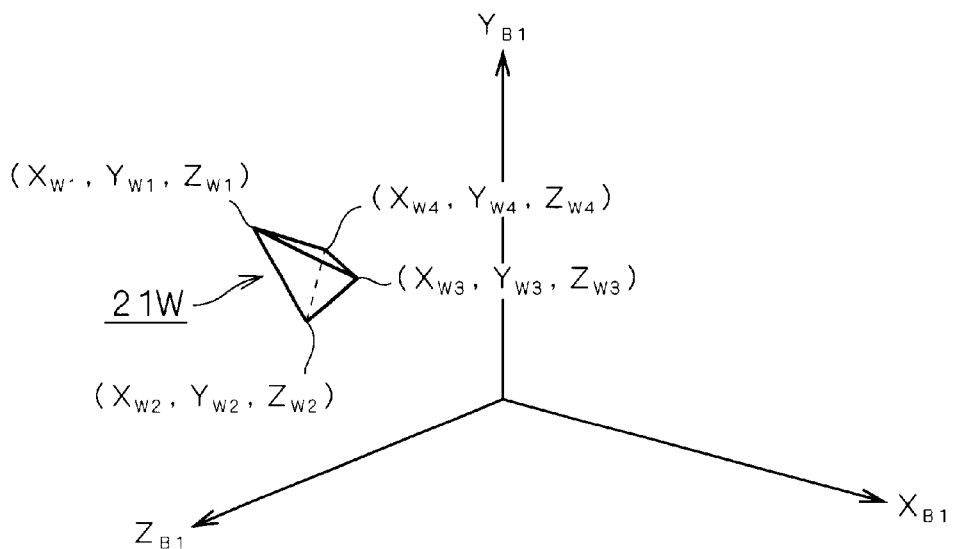
FIG. 4 is a diagram showing an example of object data in world coordinates.

The present processing is carried out by using an algorithm such as affine transformation. The object 21B represented by the body coordinates as shown in FIG. 3 is transformed into the object data 12 in the world coordinates shown in FIG. 5 such that it is arranged as a world coordinate object 21W in a virtual three-dimensional space represented by the world coordinates as shown in FIG. 4. The object data 12 are constituted by polygon data 20W-1 to 20W-4 as shown in FIG. 5.

When the reading processing at the step S1 and the coordinate system transformation at the step S2 are completed, the routine proceeds to a step S3.

At the step S3, a light source computation is carried out based on the object data 12 obtained by the processing at the step S2 and light source data 13 input separately. By carrying out the light source computation, an RGB information is determined as a blending color information on a vertex of each polygon. If the processing is completed, the routine proceeds to a step S4.

At the step S4, viewing transformation into a view point coordinate system ($X_v$, $Y_v$, $Z_v$) in which a position of a view point is set to an origin and a direction of a line of sight from the view point is set to be a positive direction of a Z axis is carried out based on the processing output at the step S3 and view point data 14 input separately. The present processing is carried out by a geometric operation for implementing coordinate transformation by using the same method as that at the step S2. When the present processing is completed, the routine proceeds to a step S5.

At the step S5, polygon data of each object in the view point coordinate system obtained after the processing at the step S4 perform perspective projection such that a perspective can be given when they are displayed on a screen. The object data obtained by the processing at the step S5 make a set of polygon data represented by screen coordinates to which the perspective is added. After the perspective projection processing is completed at the step S5, the routine proceeds to a step S6.

Figure 6:
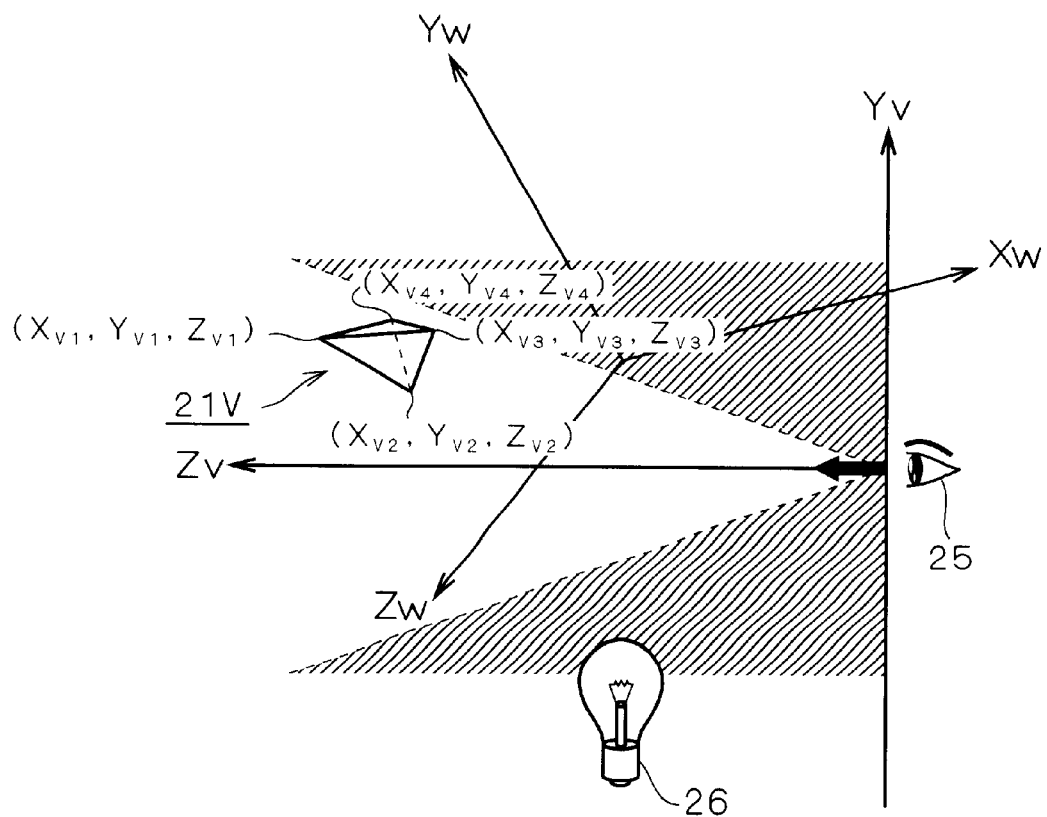
FIG. 6 is a diagram showing a viewing transformation processing image according to the first embodiment.

At the step S6, clipping for deleting data in a region protruded from a field of view is carried out. More specifically, a region shown in a slant line portion ranging outside the field of view from a view point 25 is equivalent to a region to be deleted in the clipping as shown in FIG. 6. Polygon data present in this region are decided to be out of the processing and are deleted. In the example of FIG. 6, an object 21V is decided to be disposed within the field of view. The reference numeral 26 denotes a light source. After object data 15 of the screen coordinates are output by the clipping at the step S6, the routine proceeds to a step S7.

At the step S7, hardware constraint data 16 defining various conditions in an apparatus to be incorporated (three-dimensional graphics system) are read to prepare an optimization processing to be carried out at a step S8. When the present processing is completed, the routine proceeds to the step S8.

The specific contents of the hardware constraint data 16 have the following (a) to (j) and the like:

(a) an upper bound value of a data amount per frame (which is calculated from a data transfer rate in the apparatus (three-dimensional graphics system): an input parameter for setting the upper bound value of the data amount includes a bus width, a transfer rate (an operating frequency) and a bus occupation ratio and the upper bound value of the data amount can be calculated in advance based on these input parameters);

(b) a data destination address (which can be calculated in advance from a logical address of a graphic accelerator in the apparatus and a register map in the graphic accelerator);

(c) a total data amount of a drawing instruction to be given to the graphic accelerator;

(d) a total data amount of texture (pattern) data;

(e) a bus width (bus widths of a ROM/CPU/DMA controller/a graphic accelerator which are obtained from a bus width in the apparatus);

(f) endian information (conversion is required if an endian is variously treated between the CPU and the graphic accelerator);

(g) an instruction for replacing a high order byte/a low order byte (which is required if a byte order is variously treated in the case in which data having one byte or more are to be transferred between the CPU and the graphic accelerator);

(h) presence of data compression and data compressing method (in the case in which the CPU or the graphic accelerator supports expansion or elongation of the compressed data);

(i) a data transfer instruction code of the CPU or DMA controller; and (j) a data capacity of the ROM.

At the step S7, the hardware constraint data 16 defining these informations (a) to (j) and the like are read.

At the step S8, the object data 15 represented by the screen coordinates after the perspective projection are optimized such that a data amount thereof is minimized.

Figure 7:
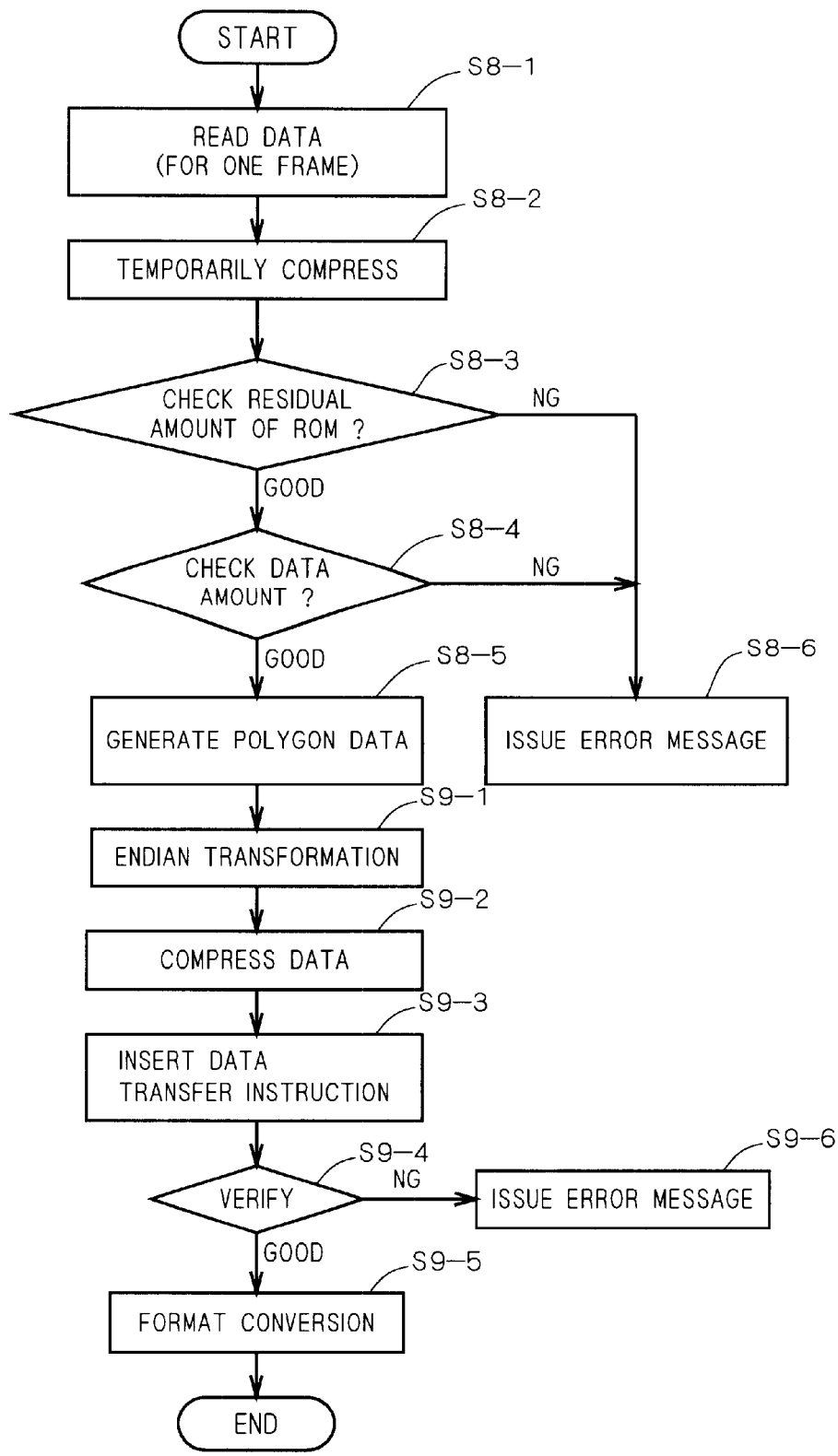
FIGS. 7 and 8 are flowcharts showing a procedure for an optimization processing according to the first embodiment.

FIG. 7 is a flowchart showing a procedure for each of the optimization processing at the step S8 and a processing of generating data for ROM writing at a step S9. The contents of the processing will be described below with reference to FIG. 7. FIG. 7 shows the optimization processing to be executed in the case in which the compression processing is carried out.

First of all, the object data 15 (a set of vertex data of a polygon of the screen coordinates and texture data) are read for one frame at a step S8-1.

At a step S8-2, next, the object data 15 for one frame thus read are temporarily compressed based on a prespecified format and an estimated value of a data amount required for drawing the frame is calculated.

At a step S8-3, then, the residual amount of the ROM to be used for the three-dimensional graphics system is checked. More specifically, whether the estimated value obtained at the step S8-2 can be stored in the ROM is temporarily checked. If it is decided that the residual capacity of the ROM is insufficient (NG) at the step S8-3, an error message is issued at a step S8-6 and the processing is ended. If it is decided that there is the residual capacity of the ROM (GOOD), the routine proceeds to a step S8-4.

At the step S8-4, a data amount is checked to verity whether it is less than a data amount which can be transferred into one frame. More specifically, it is decided that the estimated value obtained at the step S8-2 is greater than a specified value (determined by the hardware constraint data 16) (NG), an error message is issued at the step S8-6 and the processing is ended. If it is decided that the data amount is good (GOOD), the routine proceeds to a polygon data generating processing to be carried out at a next step S8-5.

Figure 8:
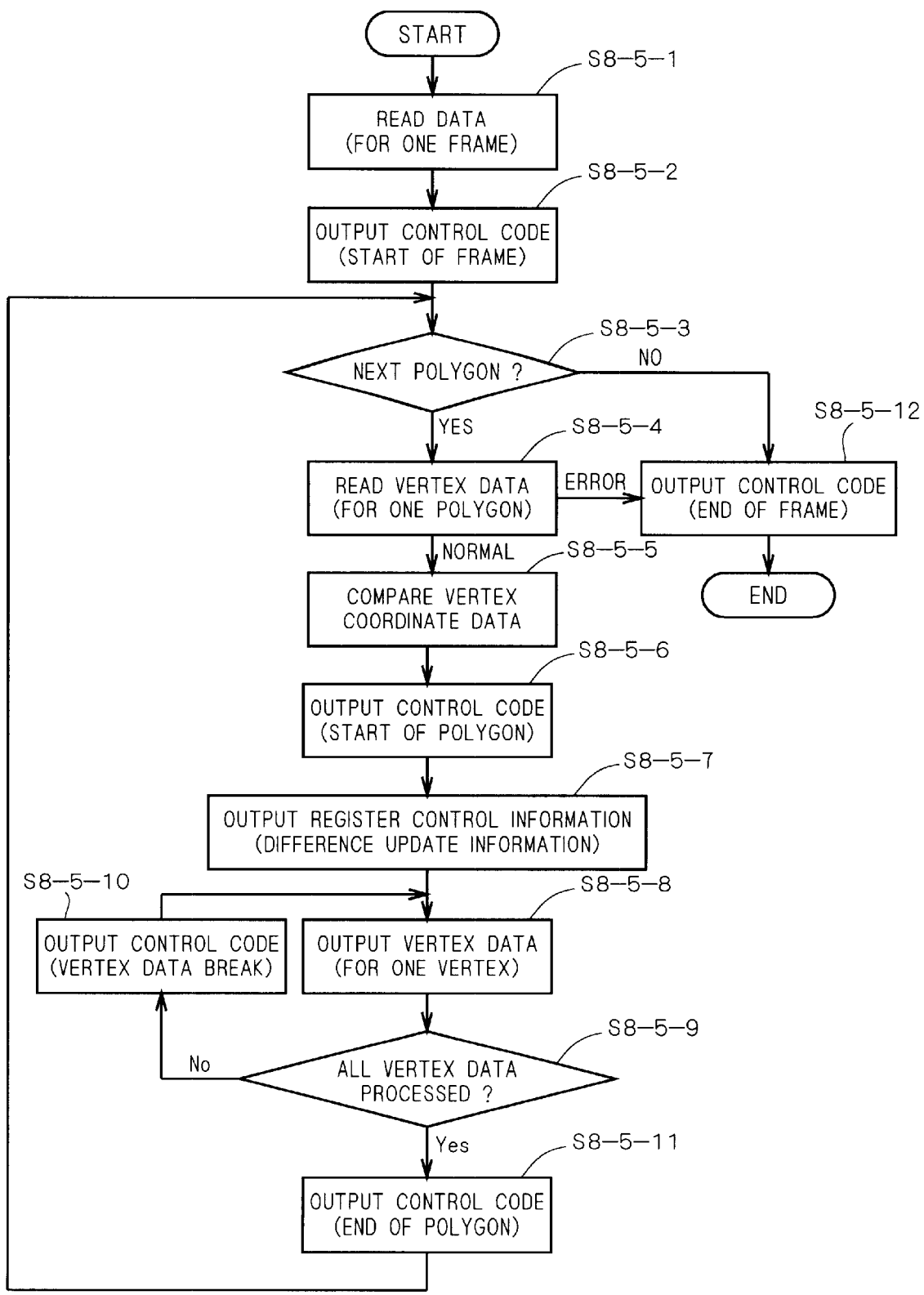

FIG. 8 is a flowchart showing a procedure for the processing of generating polygon data at the step S8-5. The contents of the processing will be described below with reference to FIG. 8.

First of all, the original object data 15 read at the step S8-1 are read for one frame at a step S8-5-1.

FIG. 9 is a diagram showing a specific example of the object data 15. As shown in FIG. 9, the object data 15 include data representing the vertex coordinates of a polygon on the screen coordinates in each frame unit by an object unit, and also include color data, texture coordinate data, texture data and the like as described above. For convenience of explanation, only coordinate data will be described below.

More specifically, the object data 15 include:
polygon data 20S-1 indicated as three vertexes of $(X_{S1}, Y_{S1}, Z_{S1})$, $(X_{S2}, Y_{S2}, Z_{S2})$ and $(X_{S3}, Y_{S3}, Z_{S3})$;
polygon data 20S-2 indicated as three vertexes of $(X_{S1}, Y_{S1}, Z_{S1})$, $(X_{S2}, Y_{S2}, Z_{S2})$ and $(X_{S4}, Y_{S4}, Z_{S4})$;
polygon data 20S-3 indicated as three vertexes of $(X_{S1}, Y_{S1}, Z_{S1})$, $(X_{S3}, Y_{S3}, Z_{S3})$ and $(X_{S4, YS4}, Z_{S4})$; and
polygon data 20S-4 indicated as three vertexes of $(X_{S2}, Y_{S2}, Z_{S2})$, $(X_{S3}, Y_{S3}, Z_{S3})$ and $(X_{S4}, Y_{S4}, Z_{S4})$, which are represented by the screen coordinates.

Figure 10:
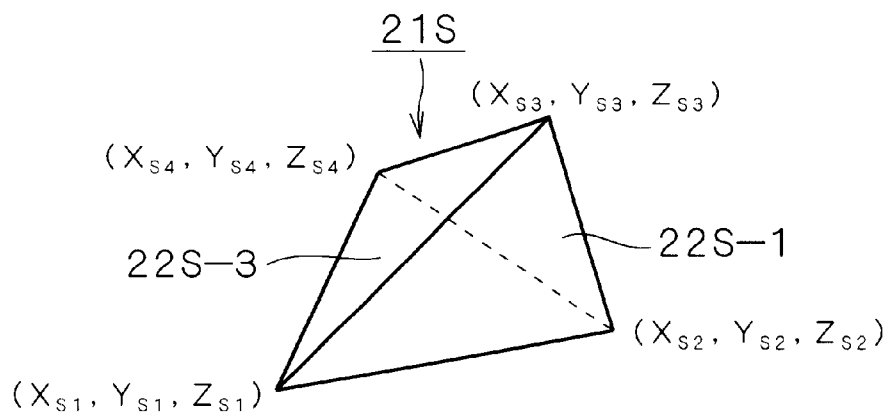
FIG. 10 is a diagram showing an object defined by the object data in FIG. 9.

As shown in FIG. 10, a screen coordinate object 21S is defined by the object data 15. A screen coordinate polygon 22S-1 is defined by the polygon data 20S-1, and a body coordinate polygon 22S-3 is defined by the polygon data 20S-3. While FIGS. 9 and 10 show the examples of description with one object, a plurality of objects may be used.

Returning to FIG. 8, when the reading processing at the step S8-5-1 is completed, the routine proceeds to a step S8-5-2. At the step S8-5-2, a control code for identification which declares the start of a frame is output to an output file 17 for storing intermediate data. When the processing of outputting a control code is completed at the step S8-5-2, the routine proceeds to a step S8-5-3.

Steps S8-5-5 to S8-5-9 where a predetermined processing is executed for each polygon are executed after the steps S8-5-3 and a step S8-5-4 and before a step S8-5-11.

At the step S8-5-3, the presence of, a polygon (next polygon) which has not been subjected to the predetermined processing is checked. If the polygon is present, the routine proceeds to the step S8-5-4. If the polygon is not present, the routine proceeds to a step S8-5-12.

At the step S8-5-4, polygon data for one polygon are read from the object data 15 for one frame read at the step S8-5-1. In the example of FIG. 9, three-vertex data indicative of the polygon 20S-1 in the screen coordinate object 21S are read.

At the step S8-5-4, it is further verified whether an error is made in the reading processing. If the error is not made and the polygon data can be acquired normally, the routine proceeds to the step S8-5-5. If the error is made (the polygon data cannot be acquired, that is, the data are ended), the routine proceeds to the step S8-5-12.

At the step S8-5-5, the vertex data of the polygon which have already been processed are compared with the vertex data of the polygon which are read at the step S8-5-4 by using coordinate values. Consequently, a register control information (an information indicating which vertex data are updated and written to any vertex register) is generated.

Figure 11:
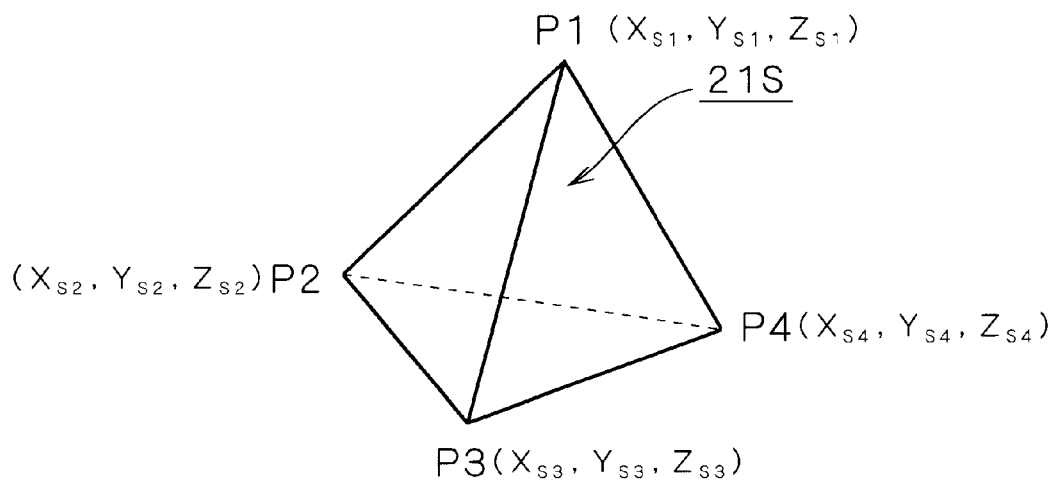

FIGS. 11 to 15 are diagrams showing the processing of the step S8-5-5. As shown in FIG. 11, the operation of the step S8-5-5 will be described below by indicating the vertex coordinate values $(X_{S1}, Y_{S2}, Z_{S1}), (X_{S2}, Y_{S2}, Z_{S2}), (X_{S3}, Y_{S3}, Z_{S3})$ and $(X_{S4}, Y_{S4}, Z_{S4})$ of the screen coordinate object 21S as P1, P2, P3 and P4, respectively.

First of all, in the case in which a polygon 22S-1 represented by the vertexes P1, P2 and P3 is acquired at the step S8-5-3 as shown in FIG. 12, the processed polygon data to be compared are not present. Therefore, it is indicated that all the vertex values are updated and a register control information for setting write destinations of the vertex data P1 to P3 to vertex registers 30-1 to 30-3 of a vertex register group 30 is generated. The vertex register group 30 implies a register group provided in the graphic accelerator of the three-dimensional graphics system which will be described below.

Next, in the case in which a polygon 22S-2 represented by the vertexes P2, P3 and P4 is acquired at the step S8-5-3 as shown in FIG. 13, it is compared with the polygon 22S-1 which has been processed last time and is represented by the vertexes P1, P2 and P3. Since the vertexes P2 and P3 are identical, a register control information indicating the execution of a processing of writing the vertex P4 to the vertex register 30-1 storing the vertex P1 is generated.

Figure 14:
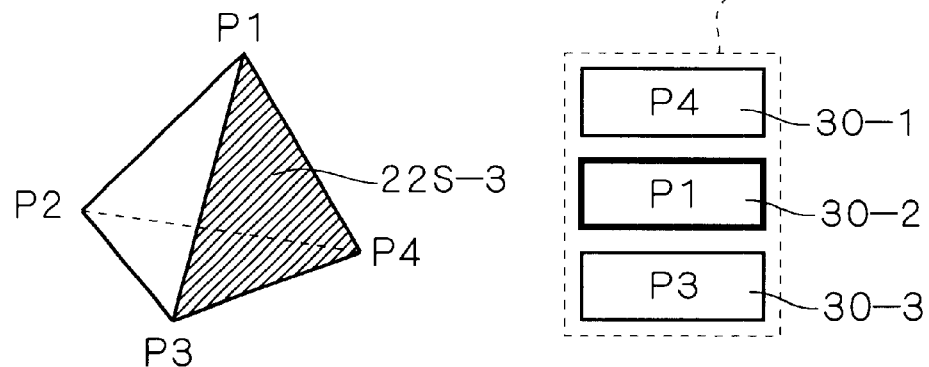

Then, in the case in which a polygon 22S-3 represented by the vertexes P1, P3 and P4 is acquired at the step S8-5-3 as shown in FIG. 14, it is compared with the polygon 22S-2 which has been processed last time and is represented by the vertexes P4, P2 and P3. Since the vertexes P3 and P4 are identical, a register control information indicating the execution of a processing of writing the vertex P1 to the vertex register 30-2 storing the vertex P2 is generated.

Figure 15:
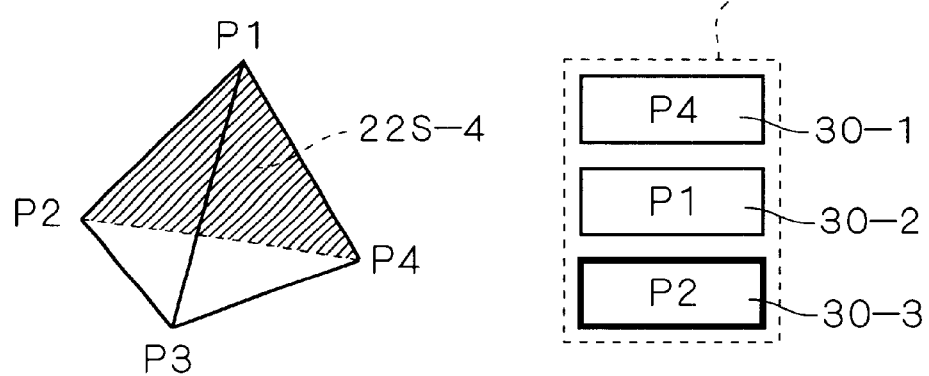

Thereafter, in the case in which a polygon 22S-4 represented by the vertexes P1, P2 and P4 is acquired at the step S8-5-3 as shown in FIG. 15, it is compared with the polygon 22S-3 which has been processed last time and is represented by the vertexes P1, P3 and P4. Since the vertexes P1 and P4 are identical, a register control information indicating the execution of a processing of writing the vertex P2 to the vertex register 30-3 storing the vertex P3 is generated.

Every time the polygon data are newly acquired at the step S8-5-3, the processing at the step S8-5-5 is executed. When the processing of comparing the vertex coordinate data is completed, the routine proceeds to a step S8-5-6.

At the step S8-5-6, a control co de for polygon identification which is indicative of the start of the polygon data is output to the output file 17. When the control code for polygon identification is completely output, the routine proceeds to a step S8-5-7.

At the step S8-5-7, the register control information obtained at the processing of comparing the vertex coordinate data at the step S8-5-5 is output to the output file 17 together with control codes for register control information identification which are indicative of the start and end of the register control information. When the output processing is completed, the routine proceeds to a step S8-5-8.

At the step S8-5-8, vertex data having a write destination determined in the processing of comparing the vertex coordinate data at the step S8-5-5 are output for one vertex to the output file 17. When the output processing is completed, the routine proceeds to a step S8-5-9.

At the step S8-5-9, it is ascertained whether all new vertex data obtained in the processing of comparing the vertex coordinate data at the step S8-5-5 are processed.

If the vertex data to be processed remain (No), the routine proceeds to a step S8-5-10 where a control code for identification which is indicative of a break of the vertex data is output to the output file 17 and the processings at and after the step S8-5-8 are repeated.

If the vertex data to be processed do not remain and all the vertex data have been processed (Yes), the routine proceeds to a step S8-5-11.

At the step S8-5-11, a control code for identification which is indicative of the end of the polygon data is output to the output file 17 and the routine returns to the step S8-5-3.

Description will be given to the operation of the step S8-5-12 to be executed when it is decided that the polygon data to be next processed do not remain at the step S8-5-3 or a reading error is detected at the step S8-5-4.

At the step S8-5-12, a control code for identification which is indicative of the end of a frame is output to the output file 17 and the output file 17 is closed. Thus, the step S8-5 is ended.

The operation of the optimization processing at the step S8 has been described above. When the above-mentioned processing is completed, the routine proceeds to a step S9.

Returning to FIG. 7, when the processing of the step S8 is ended, a processing of generating data for ROM writing at the step S9 is executed (steps S8-6 to S9-6) for the data output to the output file 17.

First of all, endian conversion and a processing of replacing high order/low order bytes are executed at a step S9-1.

Next, data compression is carried out based on a prespecified format at a step S9-2.

Then, a processing of inserting a data transfer instruction is executed at a step S9-3, which will be described below in detail. In the three-dimensional graphics system, instruction data for transferring the compressed data to be stored in the ROM to the graphic accelerator and a drawing instruction for the graphic accelerator are added to the compressed polygon data. More specifically, a data transfer instruction indicative of a destination of the data based on the type of the data (for example, a vertex register in the graphic accelerator for the polygon drawing instruction) and a data length is added. Since the texture data are to be referred by a polygon drawing instruction, a drawing instruction is not added thereto.

At a step S9-4, it is finally verified whether a data amount estimated as data to be finally written to the ROM (which are indicated as the data 18 for ROM writing in FIG. 1) after format conversion to be executed at a step S9-5 exceeds the residual capacity of the ROM or exceeds a data amount which can be transferred within one frame period. If there is no problem (GOOD), the routine proceeds to the step S9-5. If there is abnormality (NG), an error message is issued at a step S9-6.

At the step S9-5, the format conversion for committing a drawing command to ROM is carried out. In other words, the data obtained after the execution of the step S9-4 (the polygon data (including the texture data), the register control information and the like) are converted into a specified format. Consequently, the data 18 for ROM writing are obtained.

The basic operation for one frame in the processing of generating data for 3D-CG according to the first embodiment has been described above. The same processing is repeated for each frame so that a set of data 18 for ROM writing in a frame unit is obtained. The set of data 18 for ROM writing is loaded as data for 3D-CG into the three-dimensional graphics system having a comparatively low throughput.

A processing of sharing a part of data (for example, sharing texture data) is further executed for the data 18 for ROM writing. Consequently, it is also possible to obtain data for 3D-CG which are peculiar to an application such as a game using the 3D-CG.

The data 18 for ROM writing are programmed into a semiconductor ROM by a ROMing device (PROM writer) which is not shown or are used as an input of a data CAD program for manufacturing a semiconductor which is not shown, and are committed to mask ROM.

The data 18 for ROM writing include neither sound data for playing an effective sound to be used together with the display of an object nor a program for determining a drawing order of each frame.

However, various informations for controlling the graphic accelerator described above (the register control information and the like) are prepared as the data 18 for ROM writing. Therefore, it is comparatively easy to create a three-dimensional graphic program using the data for 3D-CG which are the data 18 for ROM writing.

As described above, according to the first embodiment of the present invention, it is possible to generate data for 3D-CG including optimized polygon data (drawing data) required for commitment to ROM and a control information thereof (a register control information and the like) based on polygon data divided for each frame, a correlation information of each coordinate system, a view point information, a light source information and a constraint information during the commitment to ROM.

According to the first embodiment, furthermore, it is slightly hard to direct interactive properties using a view point movement (walk-through) together with a free motion in a space. However, the geometry operation is executed at the steps S2 and S4 to S6, and the light source computation is executed at the step S3. Therefore, it is not necessary to execute the geometry operation, the light source processing and the like required in an apparatus (three-dimensional graphics system) to which the data for 3D-CG are to be incorporated. Consequently, the throughput of a CPU or the geometry operation section and the light source processing section in the graphic accelerator which execute the processings are not required. Accordingly, it is possible to inexpensively constitute the three-dimensional graphics system.

In addition, the optimization processing at the step S8 in the method of generating data for 3D-CG according to the first embodiment includes a processing of generating a control register information such that vertex data which are redundant between a plurality of polygons constituting an object are omitted. Therefore, a storage capacity of the data for 3D-CG in the three-dimensional graphics system can be reduced still more.

Furthermore, the step S8 in the method of generating data for 3D-CG according to the first embodiment includes a condition related to a ROM storage capacity to be used in the three-dimensional graphics system and a condition related to a transferable data amount of the three-dimensional graphics system in one frame. Therefore, the data for 3D-CG can be generated to be adapted to the ROM storage capacity and the transferable data amount of a predetermined three-dimensional graphics system.

Figure 16:
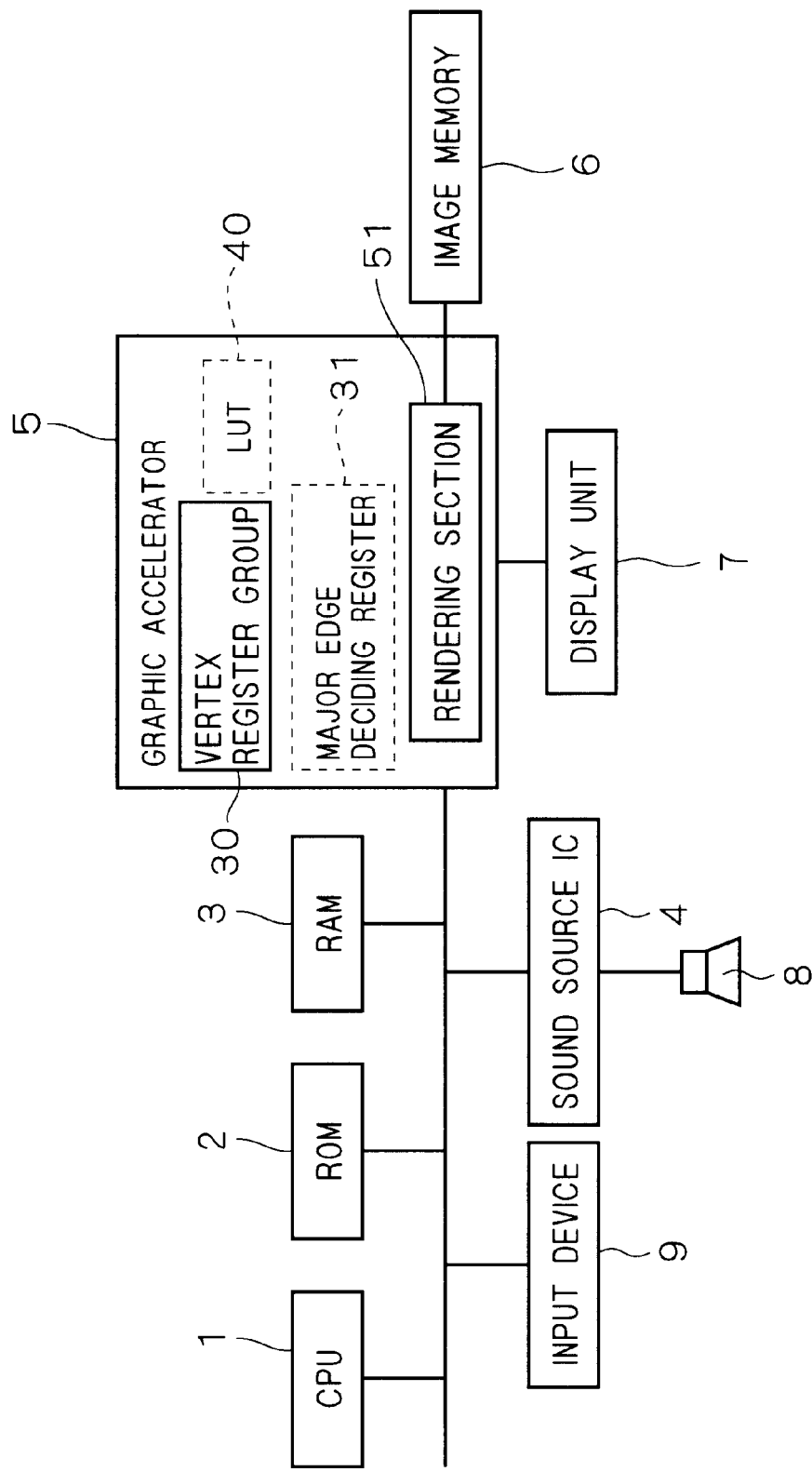
FIG. 16 is a block diagram showing an example of a structure of a three-dimensional graphics system using the data for three-dimensional CG generated according to the first embodiment.

FIG. 16 is a block diagram showing an example of a structure of the three-dimensional graphics system for carrying out three-dimensional graphics display by using the data for 3D-CG which are generated by the method of generating data for 3D-CG according to the first embodiment.

As shown in FIG. 16, a CPU 1, a ROM 2, a RAM 3, a sound source IC 4, an image memory 6, a display unit 7 and an input device 9 are directly connected to a graphic accelerator 5, and a speaker 8 is connected to the sound source IC 4.

The data for 3D-CG (the data 18 for ROM writing) which are generated in the first embodiment and a three-dimensional graphic control program to be executed by using the data for 3D-CG are stored in the ROM 2.

The CPU 1 executes the program stored in the ROM 2 while using the RAM 3 as a work area based on an input information obtained by the input device 9, thereby generating the data for 3D-CG in a frame unit and sequentially transferring the same data to the graphic accelerator 5. If necessary, a playing information is transferred to the sound source IC 4.

The graphic accelerator 5 executes a three-dimensional graphics operation processing for the data transferred from the CPU 1 and writes the resultant screen drawing data to the image memory 6. The screen drawing data of the image memory 6 are transferred to the display unit 7 in a specified timing.

The reference numeral 31 denotes a major edge deciding register for processing the data for 3D-CG which are generated by a method of generating data for 3D-CG according to a second embodiment, and the reference numeral 40 denotes a color look-up table (LUT) for processing data for 3D-CG which are generated by a method of generating data for 3D-CG according to a third embodiment.

Figure 23:
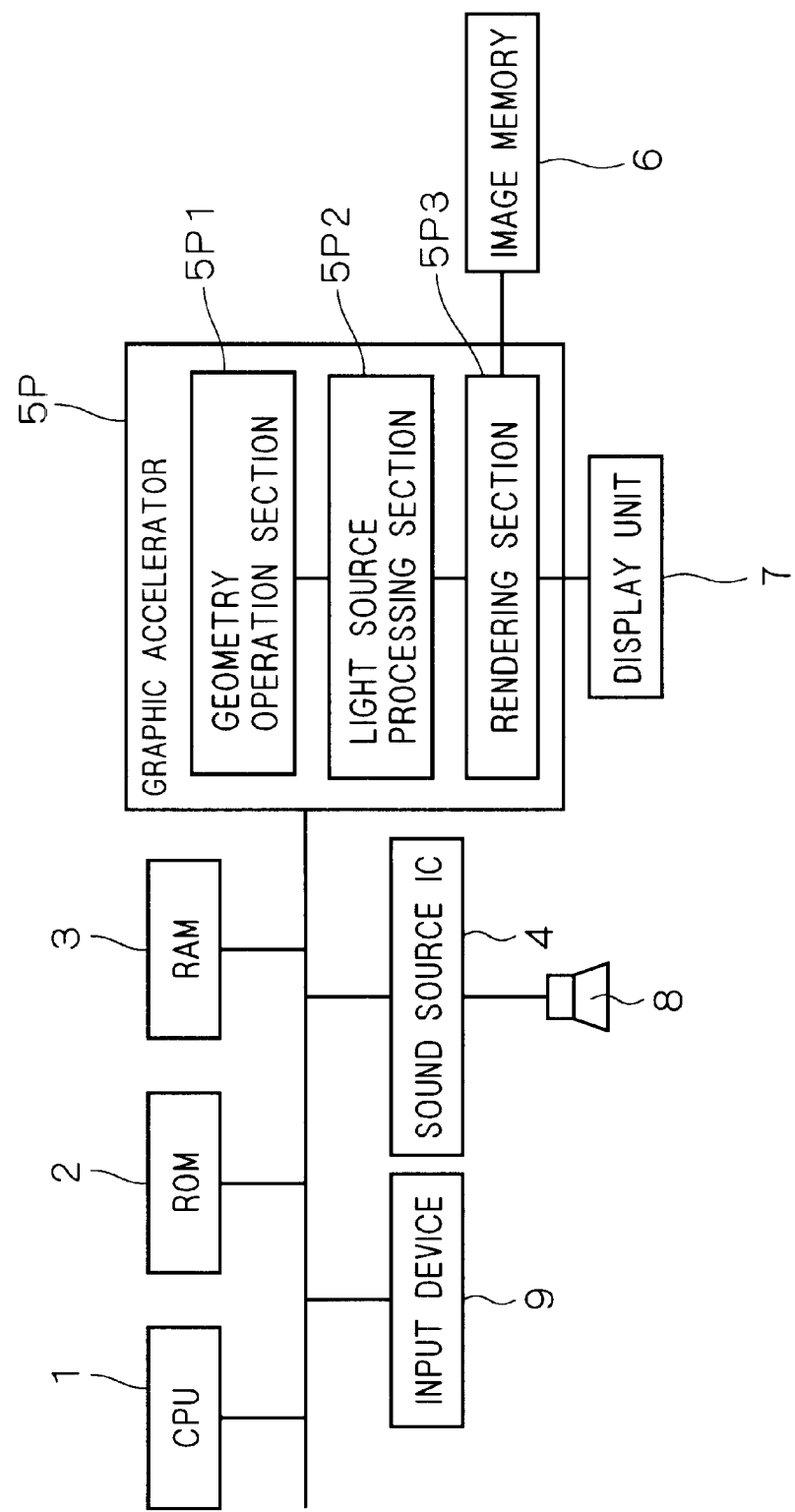
FIG. 23 is a block diagram showing an example of a structure of a conventional three-dimensional graphics system.
Figure 24:
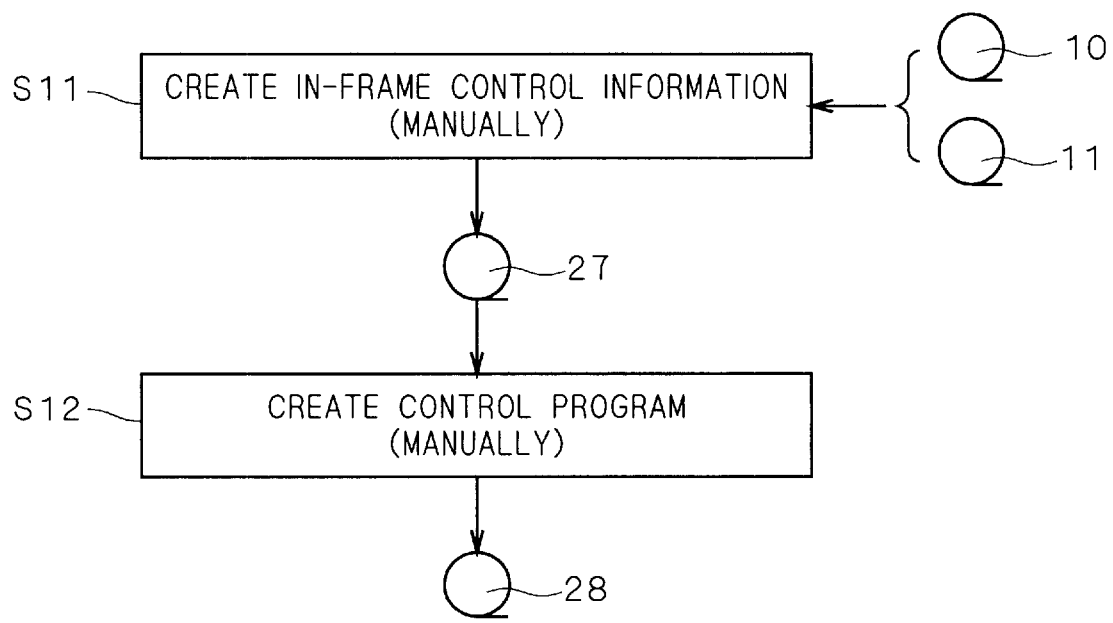
FIG. 24 is a flowchart showing a conventional method of generating a control program for three-dimensional graphics.

Thus, the graphic accelerator 5 does not require a geometry processing section and a light source processing section. Therefore, the structure of a circuit can be more simplified than the conventional structure described with reference to FIG. 23. Consequently, it is possible to sufficiently implement three-dimensional graphics display at a practical level in a three-dimensional graphics system having a comparatively low throughput which is restricted to a hardware structure, for example, a portable apparatus.

In addition, the amount of the data for 3D-CG to be written to the ROM 2 (the data 18 for ROM writing) can be reduced mainly by the optimization processing executed at the step S8. Therefore, it is possible to sufficiently write the data for 3D-CG also in the three-dimensional graphics system such as a portable apparatus in which the ROM 2 has a comparatively small capacity as one of throughputs.

In the three-dimensional graphics system storing the data for 3D-CG which are generated by the generating method according to the first embodiment, thus, interactive properties are restricted but the cost of an apparatus to be incorporated which would be abolished (a geometry processing section or the like) can be reduced considerably. In addition, the data for 3D-CG can sufficiently be incorporated with a reduction in the amount of the data for 3D-CG which are to be held.

<Second Embodiment>

In a method of generating data for 3D-CG according to a second embodiment of the present invention, a major edge detection processing is added to the vertex coordinate data comparison processing at the step S8-5-5 and a flag indicative of a position of a major edge is added to the data 18 for ROM writing differently from the first embodiment shown in FIG. 1. Consequently, it is not necessary to have a vertex sort function and a major edge detecting function which are to be provided in a graphic accelerator. The detailed description of repetitive steps in FIG. 1 will be properly omitted and the second embodiment will be described below.

Figure 17:
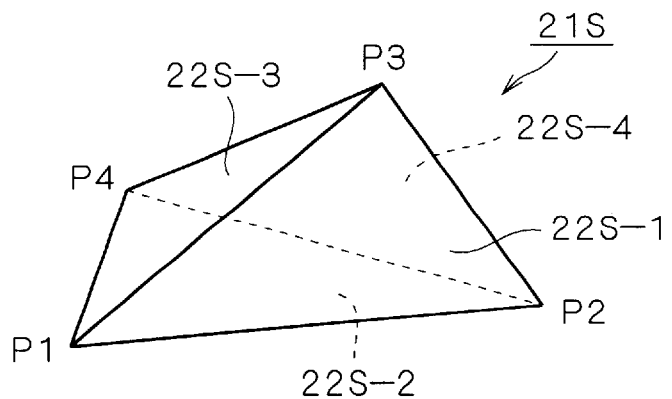
FIGS. 17 to 19 are diagrams showing a major edge setting processing according to a second embodiment.

FIG. 17 shows a vertex data group of a polygon constituting an object defined by object data 15 which are fetched at the step S8-5-1. In FIG. 17, an object 21S is constituted by a polygon 22S-1 indicated as vertexes P1, P2 and P3, a polygon 22S-2 indicated as vertexes P1, P2 and P4, a polygon 22S-3 indicated as vertexes P1, P3 and P4 and a polygon 22S-4 indicated as vertexes P2, P3 and P4.

Figure 18:
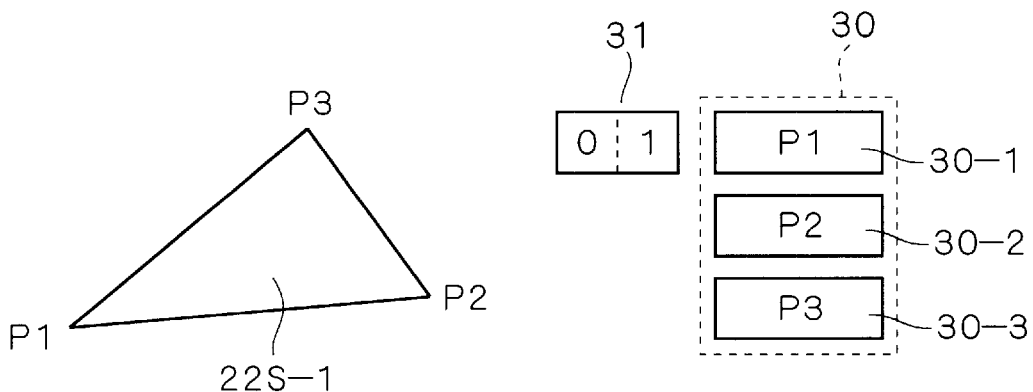
Figure 19:
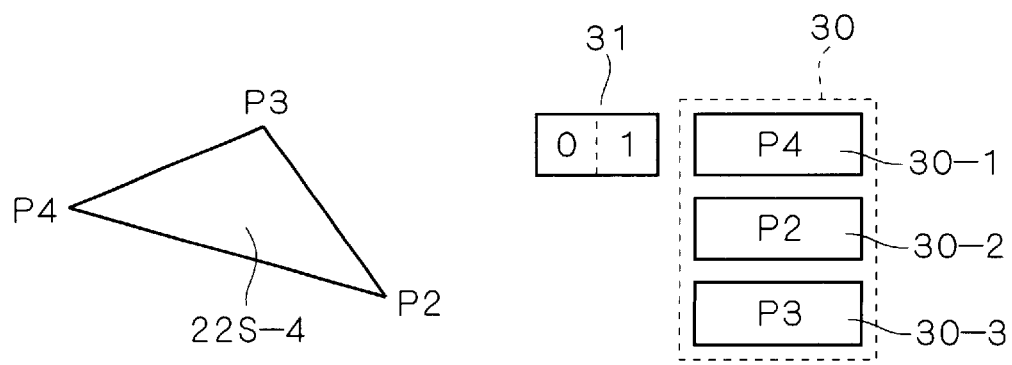

FIGS. 18 and 19 are diagrams showing a relationship between the polygon and the vertex register group. FIG. 18 shows a relationship between the polygon 22S-1 constituted by the vertexes P1, P2 and P3 fetched by a first execution of the step S8-5-4 and a vertex register part 30 in a graphic accelerator in which the same vertexes are stored. The storage of the vertex data constituting the polygon 22S-1 is not compared with anything as described in the first embodiment. Therefore, the vertex data are not appropriated. Accordingly, each value is stored in a register at random.

In FIG. 18, for example, data on the vertex P1 are stored in a vertex register 30-1, data on the vertex P2 are stored in a vertex register 30-2, and data on the vertex P3 are stored in a vertex register 30-3.

In the second embodiment, a register indicating the position of the major edge (which side between the vertexes is the major edge) is provided in the graphic accelerator. The major edge implies a side to be a reference for drawing the polygon. The major edge of each polygon can compare the vertexes of the polygon with each other and can decide them by using an existing deciding method such as a vertex sort processing for sorting on a predetermined basis.

In the graphic accelerator for drawing a triangular polygon shown in FIG. 18, three kinds of major edges are enough (P1-P2, P2-P3, P3-P1: A direction has no relation). Therefore, a 2-bit register 31 (which will be hereinafter referred to as a major edge deciding register) is prepared in a graphic accelerator 5.

A value to be set to the major edge deciding register 31 is calculated from the vertex data fetched at the step S8-5-4. Thus, a specified value is set. For example, values of 1 ("01"), 2 ("10") and 3 ("11") are set to P1-P2, P2-P3 and P3-P1, respectively.

After the above-mentioned processings are executed, the routine proceeds to the processings at and after the step S8-5-6. Since the processings are the same as those in the first embodiment shown in FIG. 8, description will be omitted.

At the step S8-5-7 shown in FIG. 8, the register control information is output to an output file 17 together with the major edge deciding register information defining the major edge deciding register 31 which is obtained at the step S8-5-5 in the second embodiment. At this time, control codes for identification indicative of the start and end of the major edge deciding register information are further added in order to distinguish the major edge deciding register information from a vertex register information in the register control information.

Subsequently, the same processing is sequentially applied to the screen coordinate polygon 22S-4 defined by data on a next polygon shown in FIG. 19 and the like. Thus, an information required for commitment to ROM is generated while the major edge is decided, and data 18 for ROM writing are finally generated at the step S9 shown in FIG. 1.

As described above, the processings for the major edge decision (including the vertex sort processing) which are required in a rendering section of the graphic accelerator are previously carried out in the stage of generating data for 3D-CG, and the data 18 for ROM writing including an information indicative of the decided major edge are prestored as the data for 3D-CG in a ROM of the three-dimensional graphics system and the like.

Accordingly, the graphic accelerator 5 of the three-dimensional graphics system having the structure shown in FIG. 16 can recognize a major edge of each polygon by referring to the major edge deciding register 31 provided therein. Consequently, it is possible to reduce the quantity of circuits for executing the major edge decision processing (including the vertex sort processing) of the graphic accelerator 5.

<Third Embodiment>

In a method of generating data for 3D-CG according to a third embodiment of the present invention, the optimization processing at the step S8 shown in FIG. 1 is carried out and an RGB color information conversion processing is further carried out prior to the processing of generating data for ROM writing at the step S9 differently from the first embodiment described above.

More specifically, an RGB color information given to each vertex of a polygon is changed into an index number information of a color look-up table (LUT) and a color look-up table control information in the same frame is generated and output. As shown in FIG. 16, an LUT 40 is stored in a graphic accelerator 5 of a three-dimensional graphics system. Repetitive portions of the steps shown in FIG. 1 will be properly omitted and the third embodiment will be described below.

Figure 20:
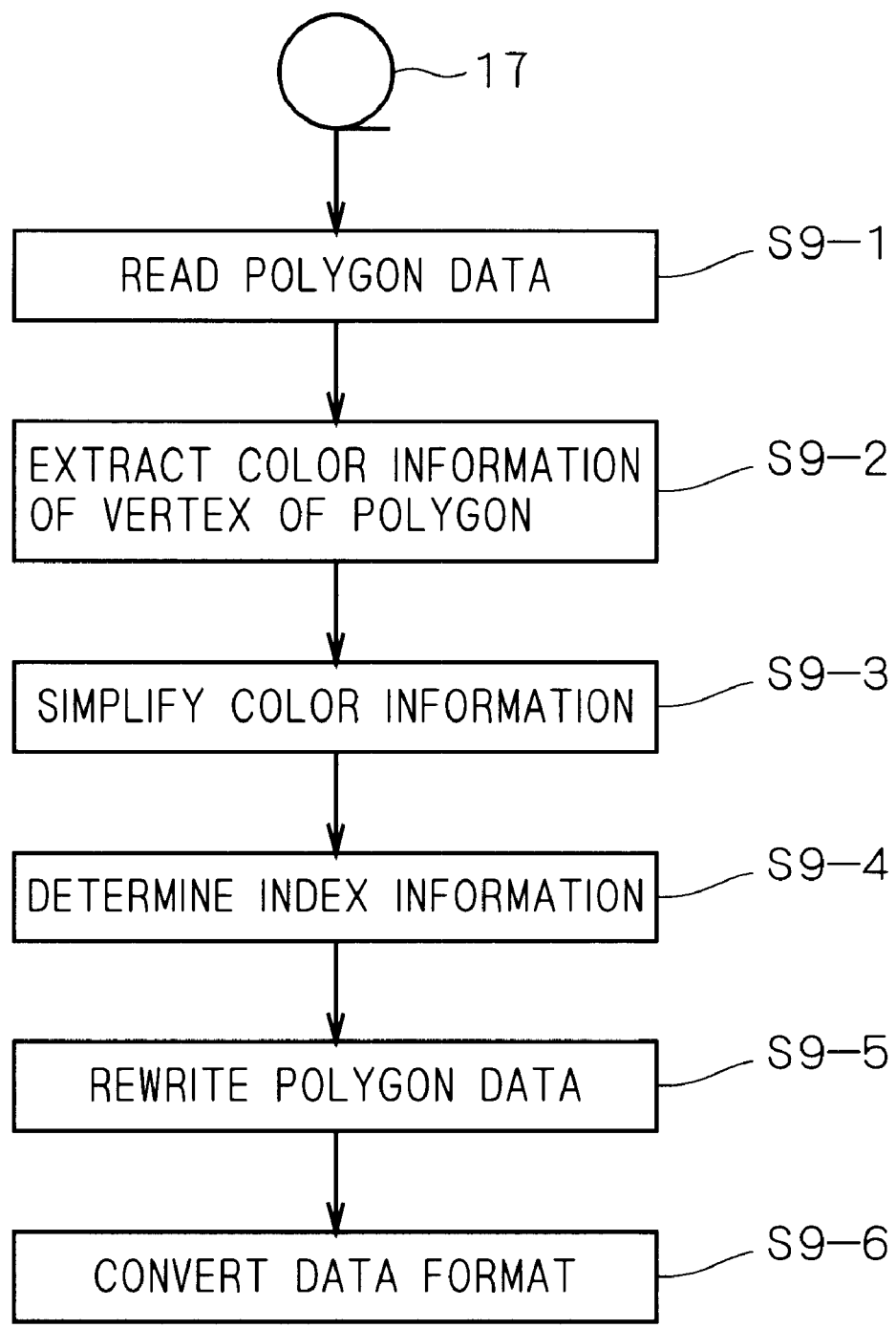
FIG. 20 is a flowchart showing a procedure for a format conversion processing in a method of generating data for three-dimensional CG according to a third embodiment of the present invention.

FIG. 20 is a flowchart showing the RGB color information conversion processing in the method of generating data for 3D-CG according to the third embodiment of the present invention. This flow is a processing to be executed directly before the format conversion processing at the step S9 shown in FIG. 1 as described above. A procedure for the processing according to the third embodiment will be described below with reference to FIG. 20.

At a step S9-1, first of all, polygon data for one frame are read from an output file 17 from which the result of the processing at the step S8 is output.

At a step S9-2, next, an RGB color information used in each vertex of a polygon is extracted from the polygon data for one frame read at the step S9-1. More specifically, the RGB color information includes $(R_1, G_1, B_1)$, $(R_2, G_2, B_2)$ and the like. After the RGB color informations on all vertexes of all polygons defined in one frame are completely extracted, the routine proceeds to a step S9-3.

At the step S9-3, a simplification processing for deleting the same value to leave only the different RGB color informations is executed for the RGB color information extracted at the step S9-2. When the processing is completed, the routine proceeds to a step S9-4. When the same value is to be deleted during the execution of the step S9-3, a repetition frequency for the same color data should be obtained.

At the step S9-4, an index information is sequentially obtained for the RGB color information data which have been subjected to the simplification processing. The index information corresponds to an index number of the color look-up table 40 provided in the graphic accelerator 5 (see FIG. 16), and has a smaller amount than the RGB color information.

For example, in the case in which the RGB color information has 24 bits, each of R, G and B having 8 bits, high order 3 bits are extracted from the 8 bits of each of the R, G and B of the RGB color information and the RGB color information is converted into an index information capable of representing 512 kinds of colors with 9 bits in total such that 3 bits are assigned to each of the R, G and B. The number of used entries of the LUT is determined by the number of bits of the index information. In the above-mentioned example, the maximum number of entries of the LUT is $2^9=512$ which can be indicated by an index information bit width of 9 bits.

When the index number is to be determined at the step S9-4, optimization is carried out such that the change amount of an LUT color information of the color look-up table is minimized based on the result of comparison of all color look-up table color informations (that is, RGB color informations related to the index number which will be hereinafter referred to as "LUT color informations") in a last frame with respective RGB color informations which have been subjected to the simplification processing.

At the step S9-4, furthermore, in the case in which the number of the used entries exceeds the maximum number of entries (the number of colors) of the LUT included in the information defined by the hardware constraint data 16 given at the step S7, a processing is executed such that the number of the used entries is not greater than the maximum number of the entries, for example an approximate color is deleted.

For example, a low order bit of the RGB color information is rounded down. Thus, a processing of determining approximate colors to be treated as the same colors (subtractive color process) is carried out. More specifically, all the RGB color informations having the same contents of bits other than the rounded-down low order bit are set to have the same colors. Furthermore, when a typical color of color data which should be treated as the approximate color is to be determined, a color which does not considerably deteriorate picture quality is determined in consideration of a repetitive frequency for the same color data obtained at the step S9-3 and the number of the colors to be treated as the same colors. When the above-mentioned processing is completed, the routine proceeds to a step S9-5.

At the step S9-5, next, the RGB color information of polygon data for one frame which are read at the step S9-1 is replaced with the index information of the LUT which is obtained at the step S9-4. In this case, if the subtractive color process is carried out to use the approximate color at the step S9-4, the RGB color information is rewritten and the rewritten RGB color information is replaced with the index information.

Figure 21:
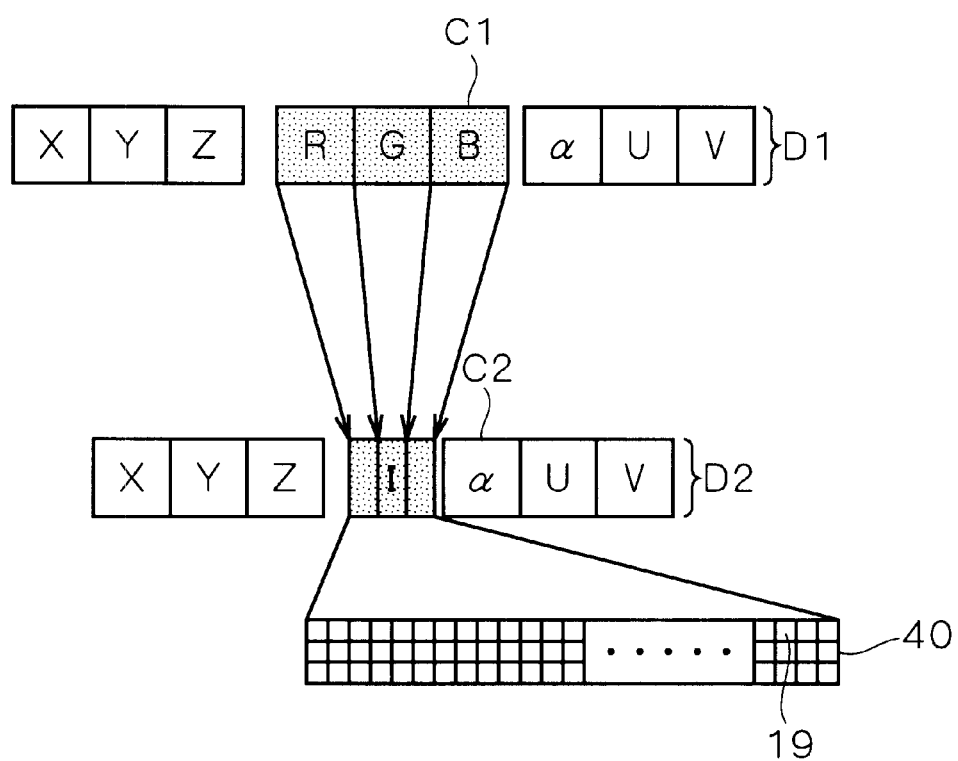
FIG. 21 is a diagram showing an example in which an RGB color information is replaced with an index information.

FIG. 21 is a diagram showing an example in which the RGB color information is replaced with the index information. As shown in FIG. 21, polygon data D1 read at the step S9-1 are converted into polygon data D2 in which an RGB color information C1 is replaced with an index information C2 by the processing executed at the step S9-5. A maximum information amount M which can be represented by the index information C2 is the maximum number of entries of the color look-up table. More specifically, the color look-up table 40 having M kinds of LUT color informations 19 which can be represented by the index information C2 is provided in the graphic accelerator 5.

Furthermore, in the case in which the LUT color information itself of the color look-up table is to be changed at the step S9-5, a rewrite instruction for the gist and a color look-up table control information are output together. The color look-up table control information is based on a difference obtained by a comparison of the LUT color informations to be used in a last frame and a current frame. The color look-up table control information is output to the graphic accelerator together with the rewrite instruction of the LUT color information for the graphic accelerator. Therefore, it is possible to change the LUT color information of the color look-up table in the graphic accelerator.

At a step S9-6, predetermined data format conversion is carried out to correspond to the format of the data 18 for ROM writing. Thus, RGB information replaced data are obtained.

As described above, according to the third embodiment of the present invention, it is possible to automatically generate the data 18 for ROM writing including optimized polygon data required for the commitment to ROM and a control information thereof based on polygon data divided for each frame, a correlation information of each coordinate system, a view point information, a light source information and a constraint information during the commitment to ROM (having the maximum number of entries of the color look-up table).

In addition, in the third embodiment, the data 18 for ROM writing are finally generated based on the RGB information replaced data obtained by the replacement of the RGB color information used in the first embodiment with the index information of the color look-up table which has a smaller amount than the RGB color information. Consequently, the ROM data amount of the three-dimensional graphics system can be reduced and a bottleneck caused by transferring the RGB color information between the ROM and the graphic accelerator can be avoided.

The contents of the processing for each frame unit have been described above. In the case in which the processings are applied to a plurality of frames, a difference in data between the frames is detected and it is decided that the vertex coordinates of all the polygons are the same and only color data are different, only the rewrite instruction indicating the rewrite of the LUT color information and the color look-up table control information are output as the RGB information replaced data without including polygon data in order to change and output the color of image data on a frame buffer.

For example, in the case in which color data (blue) specified for certain vertex data are replaced with a red color to be displayed, the RGB information replaced data are preferably obtained by adding, to the rewrite instruction, the color look-up table control information to indicate the replacement of the contents of an LUT color information corresponding to an index information specifying the blue color with those of an LUT color information corresponding to an index information specifying the red color.

By using this method, the data amount of the data 18 for ROM writing can be reduced still more.

<Fourth Embodiment>

Figure 22:
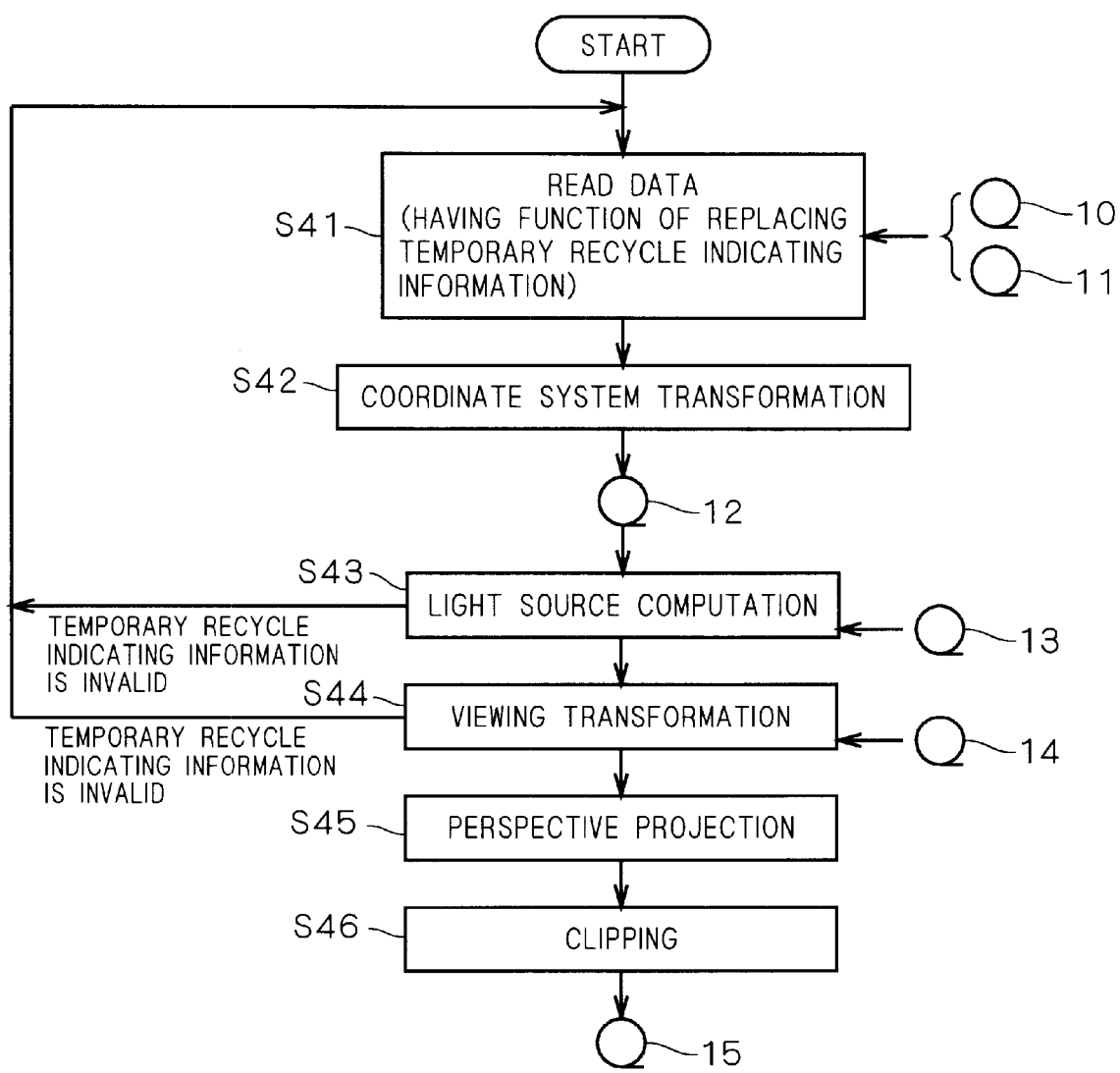
FIG. 22 is a flowchart showing a part of an operation flow of the method of generating data for three-dimensional CG according to the third embodiment.

FIG. 22 shows a part of an operation flow of a method of generating data for 3D-CG according to a third embodiment of the present invention.

With reference to FIG. 22, object data 10 and scene data 11 are read in a plurality of frame units at a step S41. When the scene data 11 defining the operation of an object in each frame are read, a processing of detecting a difference between continuous frames is further carried out in the case in which a recycle deciding flag is set to a decision enabling state. More specifically, the scene data 11 are divided in a frame unit and coordinate values (body coordinate values) of a bone (a predetermined portion of the object to be the basic portion of the operation) for determining the motion of the object are compared with each other. The recycle deciding flag is initialized to the decision enabling state.

If various frames have the same contents of definition (the object data have the same contents and the like), it is decided that the motion of the object is not changed. Consequently, the same contents as the last contents in the object data 10 and the scene data 11 are deleted and a temporary recycle indicating information for temporarily indicating the recycle of the object is generated.

In the case in which the recycle deciding flag is set to a decision disabling state during the execution of the step S41, only a processing of reading the object data 10 and the scene data 11 in a plurality of frame units is carried out in the same manner as that at the step S1. Thus, the recycle deciding flag is set to the decision enabling state.

At a step S42, next, a coordinate system transformation processing is executed in the same manner as that at the step S2. In this case, if the temporary recycle indicating information is generated at the step S41, it is output as object data 12.

If the temporary recycle indicating information is not output as the object data 12, the same light source computation, viewing transformation, perspective projection and clipping as those at the steps S3 to S6 shown in FIG. 1 are executed at steps S43 to S46.

On the other hand, in the case in which the temporary recycle indicating information is output as the object data 12 and light source data 13 and view point data 14 are not different from those in the last frame at the steps S43 and S44 respectively, any processing is not executed at the steps S43 to S46 and the recycle indicating information is output as object data 15.

Even if the temporary recycle indicating information is output as the object data 12, it is made invalid and the recycle deciding flag is set to the decision disabling state if the light source data 13 at the step S43 or the view point data 14 at the step S44 are different from those in the last frame. Then, the routine returns to the step S41.

In the case in which the routine returns from the step S43 or the step S44 to the step S41, the recycle deciding flag is always set to the decision disabling state. Therefore, the processings at the steps S41 to S46 are executed with just the same contents as those at the steps S1 to S6 in the first embodiment in which the temporary recycle indicating information is not generated. Consequently, the object data 12 and 15 are obtained.

Since the subsequent processings are the same as those at the steps S7 to S9 shown in FIG. 1, illustration in FIG. 22 and description will be omitted. In the case in which the recycle indicating information is obtained as the object data 15 at a step corresponding to the step S9-3 shown in FIG. 7, a data transfer instruction for indicating the recycle of the object data generated in a graphic accelerator is inserted.

On the other hand, in a three-dimensional graphics system for carrying out three-dimensional graphic display based on the data for 3D-CG generated by the method of generating data for 3D-CG according to the fourth embodiment has the function of carrying out the three-dimensional graphics display with the same contents as those in previous frames upon receipt of the recycle indicating information as the data for 3D-CG.

In the method of generating data for 3D-CG according to the fourth embodiment, thus, if an object has no motion and the situations of a light source and a view point are not changed on a static screen or the like, it is possible to quickly execute a processing and to reduce the data amount of the data 18 for ROM writing by generating the data for 3D-CG which can recycle polygon data constituting an object between frames. Consequently, a time required for the processings of the generating method can be shortened and the ROM capacity of the three-dimensional graphics system can be reduced.

<Application to Recording Medium>

The method of generating data for 3D-CG according to the first to fourth embodiments is recorded as a program to be executed by a computer in a computer readable recording medium and the recording medium is executed by the computer. Consequently, the data for 3D-CG can be generated automatically.

While the invention has been described in detail, the foregoing description is in all aspects illustrative and not restrictive. It is understood that numerous other modifications and variations can be devised without departing from the scope of the invention.

What is claimed is:

1. A method of generating data for three-dimensional graphics to be used by a predetermined three-dimensional graphics system, comprising the steps of:

(a) sequentially reading three-dimensional original data including object data defining a three-dimensional object in a predetermined unit;

(b) executing an operation processing including a geometric operation and a light source computation for said three-dimensional original data, thereby obtaining operated three-dimensional data; and (c) obtaining said data for three-dimensional graphics based on said operated three-dimensional data, said step (c) executing an optimization processing such that a data amount of said data for three-dimensional graphics is more reduced than that of said operated three-dimensional data based on a hardware constraint including a constraint related to a throughput of id predetermined three-dimensional graphics system.

2. The method of generating data for three-dimensional graphics according to claim 1, wherein said step (c) includes a step of deciding a major edge to be a reference side for drawing in sides of a polygon constituting said three-dimensional object based on said operated three-dimensional data by an existing deciding method and causing said data for three-dimensional graphics to have an information defining said major edge.

3. The method of generating data for three-dimensional graphics according to claim 2, wherein said information defining said major edge includes a bit information set corresponding to each side of said polygon.

4. The method of generating data for three-dimensional graphics according to claim 1, wherein said data for three-dimensional graphics have color data, said predetermined three-dimensional graphics system has a color display function based on a color index information, and said color index information has a smaller amount than said color data, said method further comprising a step of:

d) replacing said color data in said data for three-dimensional graphics with said index color data.

5. The method of generating data for three-dimensional graphics according to claim 1, wherein said optimization processing at said step (c) includes a processing of generating said data for three-dimensional graphics such that repeated vertex data between a plurality of polygons constituting said object are omitted.

6. The method of generating data for three-dimensional graphics according to claim 1, wherein said predetermined unit includes one frame unit, and said hardware constraint includes at least one of a condition related to a storage capacity of said data for three-dimensional graphics of said predetermined three-dimensional graphics system and a condition related to a transferable data amount in one frame of said predetermined three-dimensional graphics system.

7. The method of generating data for three-dimensional graphics according to claim 1, wherein said three-dimensional graphics system performs three-dimensional graphics display with the same contents as those in a last frame when receiving a recycle indicating information, said operation processing includes an operation based on an operation condition and said predetermined unit includes a plurality of frame units, said step (a) outputs a temporary recycle indicating information if it is decided that said data for three-dimensional graphics are not changed between continuous frames, said step (b) outputs said recycle indicating information as said operated three-dimensional data without executing said operation processing when said temporary recycle indicating information is received and said operation condition is not changed between continuous frames, and said step (c) outputs said recycle indicating information as said data for three-dimensional graphics when receiving said recycle indicating information as said operated three-dimensional data.

8. The method of generating data for three-dimensional graphics according to claim 7, wherein said operation condition includes a condition related to a light source computation and a condition related to a view point.

9. A computer readable recording medium in which a program for causing a computer to execute said method of generating data for three-dimensional graphics according to claim 1 is recorded.

10. A three-dimensional graphics system which receives three-dimensional data generated by a method according to claim 1, and which does not have functions of a geometric operation and a light source computation.

11. A three-dimensional graphics system, comprising:

a vertex register group in which vertex values received from outside are stored; and a rendering section which provides screen drawing data rendered from vertex values stored in said vertex register group, wherein said vertex values data including a geometric operation and a light source computation data such that said three-dimensional system does not require functions of a geometric operation and a light source computation.

* * * * *